(12) United States Patent
Lee et al.

(10) Patent No.: US 10,635,245 B2
(45) Date of Patent: Apr. 28, 2020

(54) METHOD AND ELECTRONIC DEVICE FOR PROCESSING TOUCH INPUT

(71) Applicant: SAMSUNG ELECTRONICS CO., LTD., Suwon-si, Gyeonggi-do (KR)

(72) Inventors: Young-Dae Lee, Daegu (KR); Doo-Yong Park, Gumi-si (KR); Jeong-Wook Seo, Daegu (KR); Young-Gyun Lee, Gumi-si (KR); Jae-Hak Lee, Gumi-si (KR); Eun-Yeung Lee, Gumi-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 40 days.

(21) Appl. No.: 15/635,494

(22) Filed: Jun. 28, 2017

(65) Prior Publication Data

US 2018/0032174 A1 Feb. 1, 2018

(30) Foreign Application Priority Data

Aug. 1, 2016 (KR) .......................... 10-2016-0098216

(51) Int. Cl.
*G06F 3/044* (2006.01)
*G06F 3/041* (2006.01)

(52) U.S. Cl.
CPC .............. *G06F 3/044* (2013.01); *G06F 3/041* (2013.01); *G06F 3/0416* (2013.01); *G06F 2203/04108* (2013.01)

(58) Field of Classification Search
CPC ........ G06F 3/044; G06F 3/041; G06F 3/0416; G06F 3/0418; G06F 3/03547; G06F 3/0412; G06F 3/0488; G06F 3/045; G06F 2203/04104; G06F 2203/04107; G06F 2203/04106; G06F 2203/04108
See application file for complete search history.

(56) References Cited

U.S. PATENT DOCUMENTS

| 2010/0153876 | A1* | 6/2010 | Kim ...................... G03F 3/0482 715/800 |
| 2011/0012840 | A1* | 1/2011 | Hotelling ................ G06F 3/044 345/173 |
| 2011/0157078 | A1* | 6/2011 | Miyazawa .............. G06F 3/044 345/174 |
| 2012/0086667 | A1* | 4/2012 | Coni ...................... G06F 3/0416 345/174 |

(Continued)

FOREIGN PATENT DOCUMENTS

KR 10-2017-0036424 4/2017

*Primary Examiner* — Dismery Mercedes
(74) *Attorney, Agent, or Firm* — Nixon & Vanderhye P.C.

(57) ABSTRACT

An electronic device for processing touch input is disclosed. An electronic device may comprise a touchscreen and a processor configured to perform a first function based on a touch input made by an external object and received through the touchscreen, to determine whether the electronic device is grounded when a variation in a capacitance for the touch input increases to a preset first threshold or more, to adjust a first capacitance for the touch input where the capacitance variation occurs when the electronic device is determined to not be grounded, and to determine whether to perform a second function based on the touch input where the capacitance variation occurs based on the adjusted first capacitance.

16 Claims, 20 Drawing Sheets

(56) References Cited

U.S. PATENT DOCUMENTS

| | | | |
|---|---|---|---|
| 2012/0188198 A1* | 7/2012 | Jeong | G06F 3/044 345/174 |
| 2013/0147752 A1* | 6/2013 | Simmons | G06F 3/044 345/174 |
| 2013/0249826 A1* | 9/2013 | Jung | G06F 3/041 345/173 |
| 2014/0267082 A1* | 9/2014 | Peterson | G06F 3/0416 345/173 |
| 2014/0267108 A1* | 9/2014 | Chung | G06F 3/0416 345/173 |
| 2014/0375601 A1* | 12/2014 | Liu | G06F 3/044 345/174 |
| 2015/0277720 A1* | 10/2015 | Thorson | G06F 3/04847 345/174 |
| 2017/0090653 A1 | 3/2017 | Seo et al. | |
| 2017/0097725 A1* | 4/2017 | Wang | G06F 3/0488 |
| 2017/0177138 A1* | 6/2017 | Orlovsky | G06F 3/0416 |
| 2017/0371454 A1* | 12/2017 | Kitada | G06F 3/044 |
| 2018/0004338 A1* | 1/2018 | Khazeni | G06F 3/041 |
| 2018/0059866 A1* | 3/2018 | Drake | G06F 3/0416 |
| 2018/0157352 A1* | 6/2018 | Xu | G06F 3/044 |

\* cited by examiner (a)

(b)

(c)

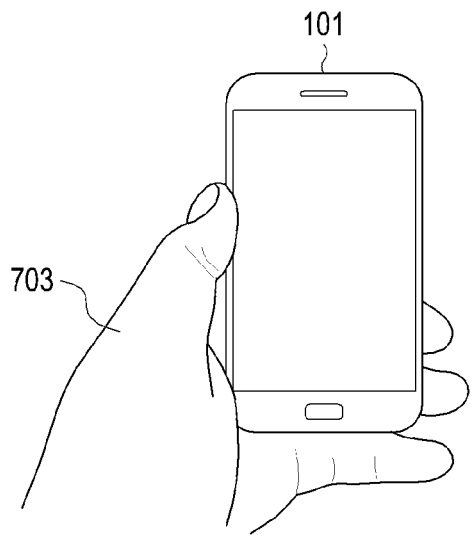
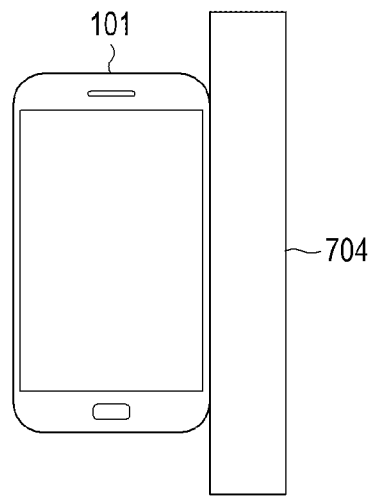
FIG.7C  FIG.7D
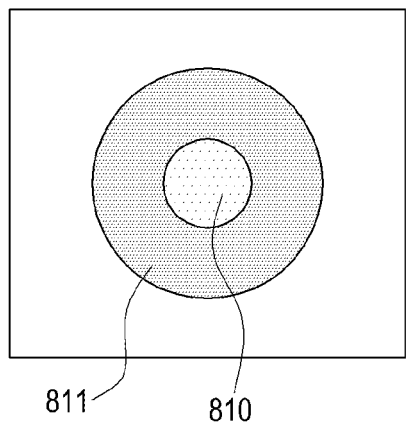
FIG.8A  FIG.8B (a)

(b)

(a)

(b)

METHOD AND ELECTRONIC DEVICE FOR PROCESSING TOUCH INPUT

CROSS-REFERENCE TO RELATED APPLICATION

This application is based on and claims priority under 35 U.S.C. § 119 to a Korean patent application filed in the Korean Intellectual Property Office on Aug. 1, 2016 and assigned Serial No. 10-2016-0098216, the disclosure of which is incorporated by reference herein in its entirety.

TECHNICAL FIELD

The present disclosure relates generally to electronic devices and methods for processing touch inputs.

BACKGROUND

The recent provision of various services using electronic devices have led to the growth of interfacing techniques between users and electronic devices, namely, technology in which electronic devices recognize various user inputs and produce various outputs as the recognized results.

As the portability of electronic devices becomes a critical issue, more use is made of touchscreen-equipped electronic devices which may perform both input and display, rather than of electronic devices having a separate input device.

An electronic device may be configured to perform different functions depending on variations in the capacitance of a touch input although the touch input is made at the same position. The capacitance of a touch input is determined under the same reference without consideration of the respective characteristics of users, which makes it difficult to exactly perform functions that the users have intended.

The above information is presented as background information only to assist with an understanding of the present disclosure.

SUMMARY

According to an example embodiment of the present disclosure, an electronic device may comprise a touchscreen and a processor configured to perform a first function based on a touch input made by an external object and received through the touchscreen, to determine whether the electronic device is grounded when a variation in a capacitance for the touch input increases to a preset first threshold or more, to adjust a first capacitance for the touch input where the capacitance variation occurs when the electronic device is determined to not be grounded, and to determine whether to perform a second function based on the touch input where the capacitance variation occurs based on the adjusted first capacitance.

According to an example embodiment of the present disclosure, an electronic device may comprise a touchscreen and a processor configured to perform a first function based on a touch input made by an external object and received through the touchscreen, to obtain or determine a variation in a capacitance for the touch input for a preset time, setting a first threshold used to determine whether to perform a second function different from the first function based on the obtained variation in the capacitance for the touch input, and when the capacitance for the touch input is changed, to determine whether to perform the second function by comparing a first capacitance for the touch input where the capacitance is varied with the first threshold.

According to an example embodiment of the present disclosure, a non-transitory computer-readable recording medium having stored thereon a program which, when executed by a processor to enable the processor to perform at least one operation comprising: performing a first function based on a touch input made by a received external object, determining whether an electronic device is grounded when a variation in a capacitance for the touch input increases to a preset first threshold or more, adjusting a first capacitance for the touch input where the capacitance variation occurs when the electronic device is determined to not be grounded, and determining whether to perform a second function based on the touch input where the capacitance variation occurs based on the adjusted first capacitance.

Other aspects, advantages, and salient features of the disclosure will become apparent to those skilled in the art from the following detailed description, which, taken in conjunction with the annexed drawings, discloses example embodiments of the disclosure.

BRIEF DESCRIPTION OF THE DRAWINGS

The above and other aspects, features and attendant advantages of the present disclosure will be apparent and more readily appreciated from the following detailed description, taken in conjunction with the accompanying drawings, in which like reference numerals refer to like elements, and wherein:

FIGS. 7A, 7B, 7C and 7D are diagrams illustrating an example method for determining whether an electronic device is grounded according to an example embodiment of the present disclosure;

FIGS. 8A and 8B are diagrams illustrating a phenomenon in which a capacitance variation is not exactly measured where the capacitance variation is caused for a touch input according to a comparison example;

Throughout the drawings, like reference numerals will be understood to refer to like parts, components, and structures.

DETAILED DESCRIPTION

Figure 1:
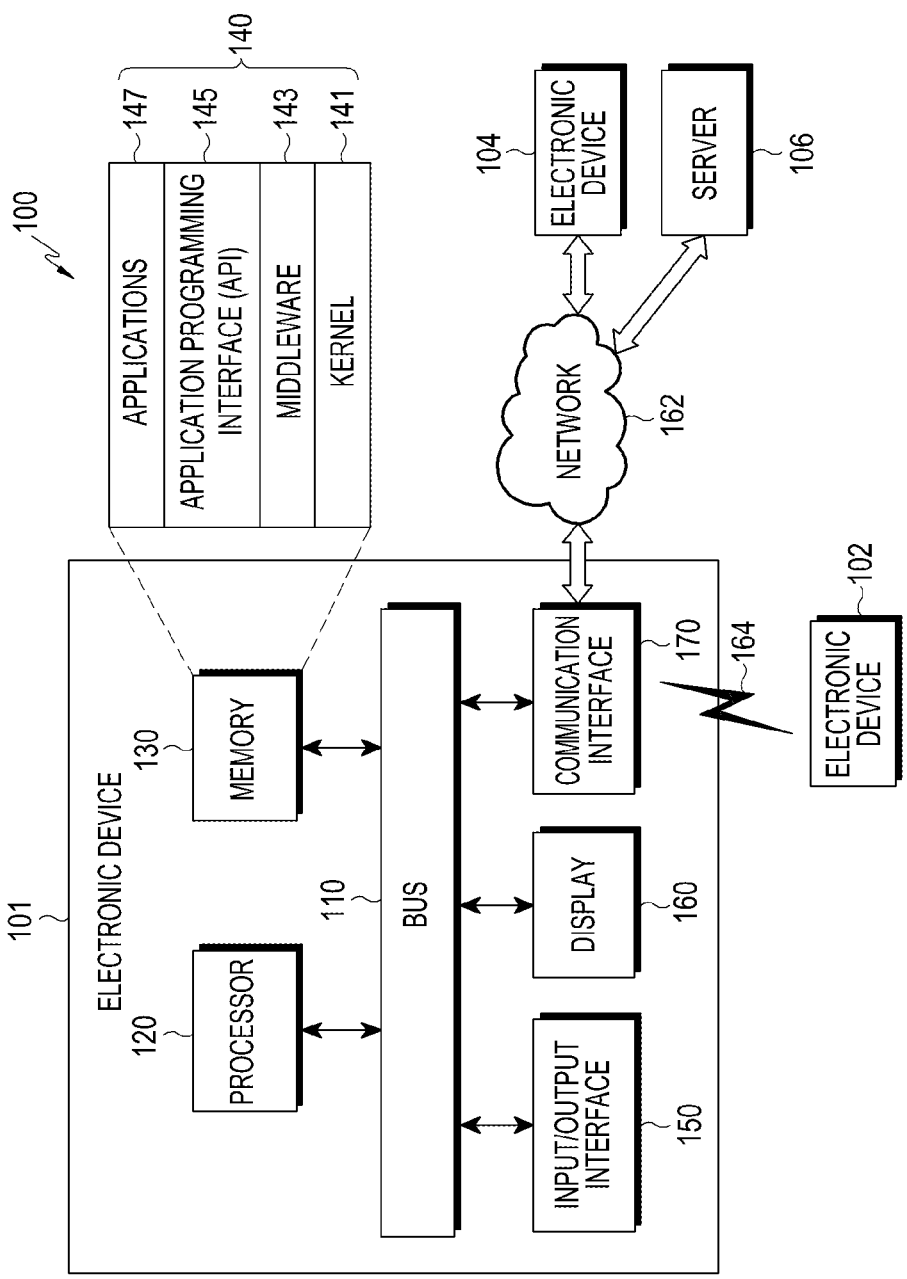
FIG. 1 is a diagram illustrating an example network environment including an electronic device according to an example embodiment of the present disclosure.

Hereinafter, various example embodiments of the present disclosure are described with reference to the accompanying drawings. However, it should be appreciated that the present disclosure is not limited to the embodiments and the terminology used herein, and all changes and/or equivalents or replacements thereto also belong to the scope of the present disclosure. The same or similar reference denotations may be used to refer to the same or similar elements throughout the specification and the drawings. It is to be understood that the singular forms "a," "an," and "the" include plural references unless the context clearly dictates otherwise. As used herein, the terms "A or B" or "at least one of A and/or B" may include all possible combinations of A and B. As used herein, the terms "first" and "second" may modify various components regardless of importance and/or order and are used to distinguish a component from another without limiting the components. It will be understood that when an element (e.g., a first element) is referred to as being (operatively or communicatively) "coupled with/to," or "connected with/to" another element (e.g., a second element), it can be coupled or connected with/to the other element directly or via a third element.

As used herein, the terms "configured to" may be interchangeably used with other terms, such as "suitable for," "capable of," "modified to," "made to," "adapted to," "able to," or "designed to" in hardware or software in the context. Rather, the term "configured to" may refer to a situation in which a device can perform an operation together with another device or parts. For example, the term "processor configured (or set) to perform A, B, and C" may refer to a generic-purpose processor (e.g., a CPU or application processor) that may perform the operations by executing one or more software programs stored in a memory device or a dedicated processor (e.g., an embedded processor) for performing the operations.

For example, examples of the electronic device according to example embodiments of the present disclosure may include at least one of a smartphone, a tablet personal computer (PC), a mobile phone, a video phone, an e-book reader, a desktop PC, a laptop computer, a netbook computer, a workstation, a server, a personal digital assistant (PDA), a portable multimedia player (PMP), a MP3 player, a medical device, a camera, or a wearable device, or the like, but is not limited thereto. The wearable device may include at least one of an accessory-type device (e.g., a watch, a ring, a bracelet, an anklet, a necklace, glasses, contact lenses, or a head-mounted device (HMD)), a fabric- or clothes-integrated device (e.g., electronic clothes), a body attaching-type device (e.g., a skin pad or tattoo), or a body implantable device, or the like, but is not limited thereto. In some embodiments, examples of the smart home appliance may include at least one of a television, a digital video disk (DVD) player, an audio player, a refrigerator, an air conditioner, a cleaner, an oven, a microwave oven, a washer, a drier, an air cleaner, a set-top box, a home automation control panel, a security control panel, a TV box (e.g., Samsung HomeSync™, Apple TV™, or Google TV™), a gaming console (Xbox™ PlayStation™), an electronic dictionary, an electronic key, a camcorder, or an electronic picture frame, or the like, but is not limited thereto.

According to an embodiment of the present disclosure, the electronic device may include at least one of various medical devices (e.g., diverse portable medical measuring devices (a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global navigation satellite system (GNSS) receiver, an event data recorder (EDR), a flight data recorder (FDR), an automotive infotainment device, an sailing electronic device (e.g., a sailing navigation device or a gyro compass), avionics, security devices, vehicular head units, industrial or home robots, drones, automatic teller's machines (ATMs), point of sales (POS) devices, or internet of things (IoT) devices (e.g., a bulb, various sensors, a sprinkler, a fire alarm, a thermostat, a street light, a toaster, fitness equipment, a hot water tank, a heater, or a boiler), or the like, but is not limited thereto.

According to various embodiments of the disclosure, examples of the electronic device may at least one of part of a piece of furniture, building/structure or vehicle, an electronic board, an electronic signature receiving device, a projector, or various measurement devices (e.g., devices for measuring water, electricity, gas, or electromagnetic waves), or the like, but is not limited thereto. According to embodiments of the present disclosure, the electronic device may be flexible or may be a combination of the above-enumerated electronic devices. According to an embodiment of the present disclosure, the electronic device is not limited to the above-listed embodiments. As used herein, the term "user" may denote a human or another device (e.g., an artificial intelligent electronic device) using the electronic device.

Referring to FIG. 1, according to an example embodiment of the present disclosure, an electronic device 101 is included in a network environment 100. The electronic device 101 may include a bus 110, a processor (e.g., including processing circuitry) 120, a memory 130, an input/output interface (e.g., including input/output interface circuitry) 150, a display 160, and a communication interface (e.g., including communication circuitry) 170. In some embodiments, the electronic device 101 may exclude at least one of the components or may add another component.

The bus 110 may include a circuit for connecting the components 110 to 170 with one another and transferring communications (e.g., control messages or capacitance) between the components.

The processor 120 may include various processing circuitry, such as, for example, and without limitation, one or more of a dedicated processor, a central processing unit (CPU), an application processor (AP), or a communication processor (CP). The processor 120 may perform control on at least one of the other components of the electronic device 101, and/or perform an operation or capacitance processing relating to communication.

The memory 130 may include a volatile and/or non-volatile memory. For example, the memory 130 may store commands or capacitance related to at least one other component of the electronic device 101. According to an embodiment of the present disclosure, the memory 130 may store software and/or a program 140. The program 140 may include, e.g., a kernel 141, middleware 143, an application programming interface (API) 145, and/or an application program (or "application") 147. At least a portion of the kernel 141, middleware 143, or API 145 may be denoted an operating system (OS). For example, the kernel 141 may control or manage system resources (e.g., the bus 110, processor 120, or a memory 130) used to perform operations or functions implemented in other programs (e.g., the middleware 143, API 145, or application program 147). The kernel 141 may provide an interface that allows the middleware 143, the API 145, or the application 147 to access the individual components of the electronic device 101 to control or manage the system resources.

The middleware 143 may function as a relay to allow the API 145 or the application 147 to communicate capacitance with the kernel 141, for example. Further, the middleware 143 may process one or more task requests received from the application program 147 in order of priority. For example, the middleware 143 may assign a priority of using system resources (e.g., bus 110, processor 120, or memory 130) of the electronic device 101 to at least one of the application programs 147 and process one or more task requests. The API 145 is an interface allowing the application 147 to control functions provided from the kernel 141 or the middleware 143. For example, the API 133 may include at least one interface or function (e.g., a command) for filing control, window control, image processing or text control. For example, the input/output interface 150 may transfer commands or capacitance input from the user or other external device to other component(s) of the electronic device 101 or may output commands or capacitance received from other component(s) of the electronic device 101 to the user or other external devices.

The display 160 may include, e.g., a liquid crystal display (LCD), a light emitting diode (LED) display, an organic light emitting diode (OLED) display, or a microelectromechanical systems (MEMS) display, or an electronic paper display, or the like, but is not limited thereto. The display 160 may display, e.g., various contents (e.g., text, images, videos, icons, or symbols) to the user. The display 160 may include a touchscreen and may receive, e.g., a touch, gesture, proximity or hovering input using an electronic pen or a body portion of the user.

For example, the communication interface 170 may include various communication circuitry and set up communication between the electronic device 101 and an external electronic device (e.g., a first electronic device 102, a second electronic device 104, or a server 106). For example, the communication interface 170 may be connected with the network 162 through wireless or wired communication to communicate with the external electronic device. Additionally, or alternatively, the communication interface 170 may be connected via a short-range wireless communication connection 164 to an external electronic device (e.g., a first electronic device 102).

The wireless communication may include cellular communication which uses at least one of, e.g., long term evolution (LTE), long term evolution-advanced (LTE-A), code division multiple access (CDMA), wideband code division multiple access (WCDMA), universal mobile telecommunication system (UMTS), wireless broadband (WiBro), or global system for mobile communication (GSM). According to an embodiment of the present disclosure, the wireless communication may include at least one of, e.g., wireless fidelity (Wi-Fi), bluetooth, bluetooth low power (BLE), zigbee, near field communication (NFC), magnetic secure transmission (MST), radio frequency, or body area network (BAN). According to an embodiment of the present disclosure, the wireless communication may include global navigation satellite system (GNSS). The GNSS may be, e.g., global positioning system (GPS), global navigation satellite system (Glonass), Beidou navigation satellite system (hereinafter, "Beidou") or Galileo, or the European global satellite-based navigation system. Hereinafter, the terms "GPS" and the "GNSS" may be interchangeably used herein. The wired connection may include at least one of, e.g., universal serial bus (USB), high definition multimedia interface (HDMI), recommended standard (RS)-232, power line communication (PLC), or plain old telephone service (POTS). The network 162 may include at least one of telecommunication networks, e.g., a computer network (e.g., local area network (LAN) or wide area network (WAN)), Internet, or a telephone network.

The first and second external electronic devices 102 and 104 each may be a device of the same or a different type from the electronic device 101. According to an embodiment of the present disclosure, all or some of operations executed on the electronic device 101 may be executed on another or multiple other electronic devices (e.g., the electronic devices 102 and 104 or server 106). According to an embodiment of the present disclosure, when the electronic device 101 should perform some function or service automatically or at a request, the electronic device 101, instead of executing the function or service on its own or additionally, may request another device (e.g., electronic devices 102 and 104 or server 106) to perform at least some functions associated therewith. The other electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technique may be used, for example.

According to an embodiment of the present disclosure, the processor 120 may receive a touch input by an external object through the touchscreen included in the display 160. The processor 120 may perform a first function according to the received touch input. The processor 120 may perform the first function corresponding to the touch input based on at least one of the position, direction, touch area, and touch strength of the received touch input. The processor 120 may recognize the position, direction, touch area, and touch strength of the touch input based on the capacitance for the touch input obtained through the touchscreen.

For example, in a case where there occurs a variation in the capacitance of the touch input by the external object received with the electronic device 101 remaining in a floating state, e.g., not grounded, e.g., when the capacitance increases as the touch area of the touch input increases, the capacitance is measured as being reduced at the center of the contact surface between the external object and the touchscreen. Accordingly, the overall capacitance for the touch input may be measured as being low as compared with the capacitance for the touch input predicted as the touch area increases. Thus, the processor 120 may fail to precisely recognize the variation in the capacitance for the touch input, so that the user's intended function might not exactly be performed.

According to an embodiment of the present disclosure, when the variation in the capacitance for the touch input received through the touchscreen increases up to a preset first threshold or more, the processor 120 may determine whether the electronic device 101 is grounded. The processor 120 may determine whether the electronic device 101 is grounded in order to identify whether the electronic device 101 is in the floating state. Such a phenomenon that the capacitance for the touch input is not precisely measured arises when the electronic device 101 is in the floating state. Thus, the processor 120 needs to check if the electronic device 101 is in the floating state. For example, the first threshold may be set to be a variation in capacitance at which the phenomenon where a capacitance for a touch input is not precisely measured starts to occur, and the first threshold may be set considering the characteristics of the touchscreen.

According to an embodiment of the present disclosure, where the electronic device 101 is connected with another electronic device or a charger, the processor 120 may determine that the electronic device 101 is grounded. Further, upon determining that a user holds the electronic device 101 through at least one sensor (e.g., the gyro sensor 240B, acceleration sensor 240E, or grip sensor 240F), the processor 120 may determine that the electronic device 101 is grounded. Upon considering that a user holds the electronic device 101 through a sensing value obtained through at least one sensor, the processor 120 may determine that the electronic device 101 is grounded.

Upon determining that the electronic device 101 contacts a conductive object through at least one sensor, the processor 120 may determine that the electronic device 101 is grounded. The above-described methods for determining whether the electronic device 101 is grounded are merely an example, and other various methods may apply to determine whether the electronic device 101 is grounded.

According to an embodiment of the present disclosure, upon determining that the electronic device 101 is not grounded, the processor 120 may adjust a first capacitance for the touch input where a variation in capacitance occurs. Where the electronic device 101 is not grounded, and the variation in the capacitance for the touch input reaches the first threshold or more, the processor 120 may determine that the phenomenon that a capacitance is not exactly measured has happened. Accordingly, the processor 120 may adjust the first capacitance for the touch input where the variation in capacitance has occurred.

For example, the processor 120 may identify a loss in the first capacitance for the touch input where the variation in capacitance has occurred and adjust the first capacitance by restoring the identified loss.

The processor 120 may also set an area with respect to the center of the touch input where the variation in capacitance has occurred and adjust the first capacitance by adding a preset weight to a second capacitance corresponding to the set area of the first capacitance. A specific method for adjusting the first capacitance is described below in detail.

According to an embodiment of the present disclosure, the processor 120 may determine whether to perform a second function according to the touch input where the variation in capacitance has occurred based on the adjusted first capacitance. The second function may be a function different from the first function that was performed according to the touch input before the capacitance variation for the touch input occurs. Hereinafter, the second function may denote a function that, as a variation in the capacitance for a touch input for performing the first function occurs, is performed according to the touch input where the capacitance variation occurs. For example, the second function may refer to a function that is performed according to a touch input having a larger capacitance than a touch input for performing the first function.

For example, the processor 120 may compare the adjusted first capacitance with a preset second threshold, and when the adjusted first capacitance is equal to or more than the preset second threshold, the processor 120 may determine to perform the second function and perform the second function. When the adjusted first capacitance is less than the preset second threshold, the processor 120 may determine not to perform the second function.

According to an embodiment of the present disclosure, the processor 120 may set the second threshold using at least one of an angle between the touchscreen and the external object, which is calculated based on the capacitance, or a variation in the capacitance for the touch input, which is obtained for a preset time. The preset time may be a fixed time or may also be varied depending on, e.g., the circumstance where the touch input is received, the capacitance for the touch input, touch area, or touch strength.

For example, the variation in the capacitance for the touch input, touch strength, or touch area may differ per person due to, e.g., a difference in the user's touching action, or differences in the thickness or size of his/her fingers. Thus, upon receiving the touch input, the processor 120 may set the second threshold that is used to determine whether the second function is performed through the received touch input. A specific method for setting the second threshold is described below in greater detail.

Figure 2:
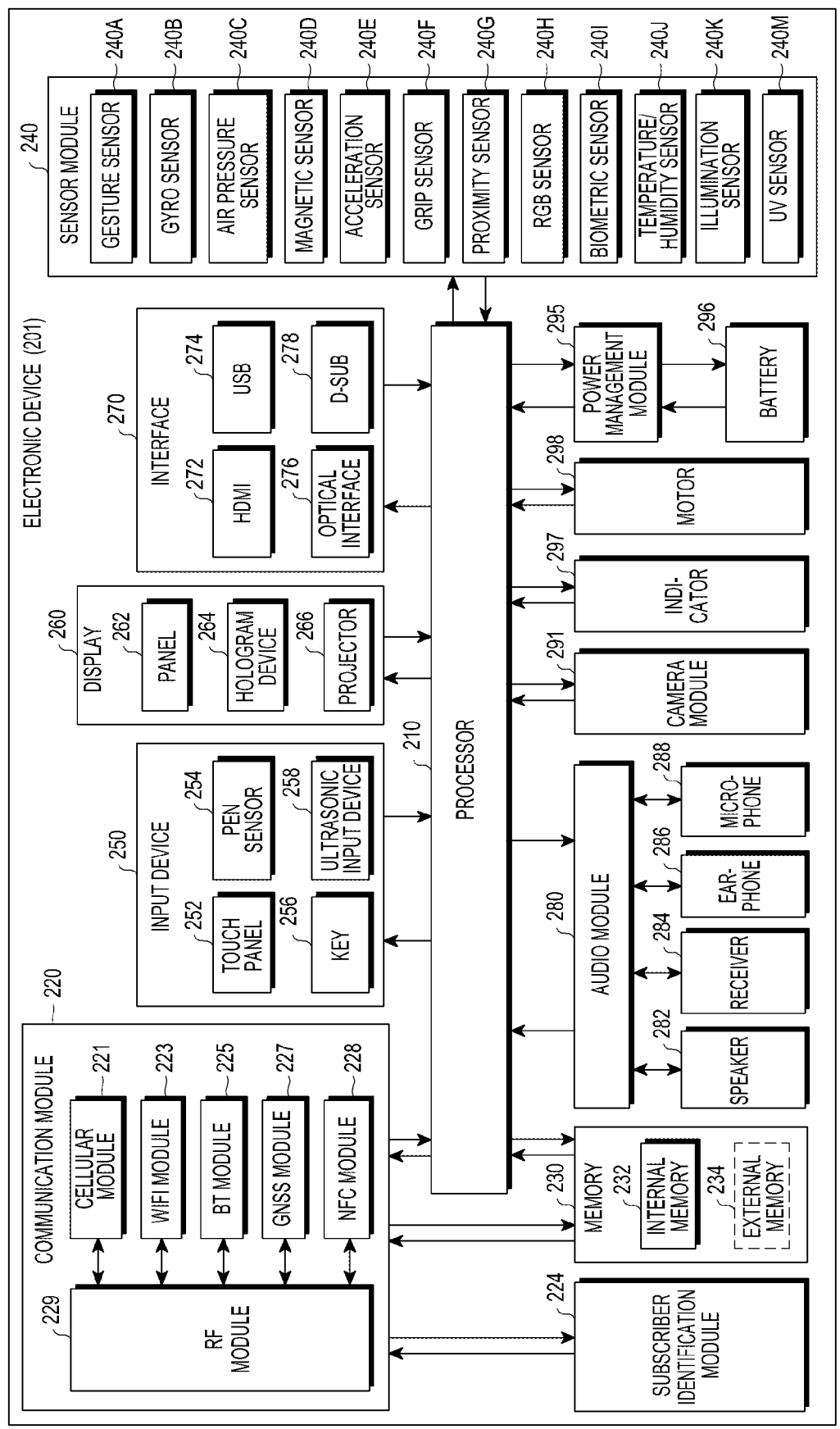
FIG. 2 is a block diagram illustrating an example electronic device according to an example embodiment of the present disclosure.

FIG. 2 is a block diagram illustrating an example electronic device 201 according to an example embodiment of the present disclosure. The electronic device 201 may include the whole or part of the configuration of, e.g., the electronic device 101 illustrated in FIG. 1.

The electronic device 201 may include one or more processors (e.g., application processors (APs)) (e.g., including processing circuitry) 210, a communication module (e.g., including communication circuitry) 220, a subscriber identification module (SIM) 224, a memory 230, a sensor module 240, an input device (e.g., including input circuitry) 250, a display 260, an interface (e.g., including interface circuitry) 270, an audio module 280, a camera module 291, a power management module 295, a battery 296, an indicator 297, and a motor 298.

The processor 210 may include various processing circuitry and control multiple hardware and software components connected to the processor 210 by running, e.g., an operating system or application programs, and the processor 210 may process and compute various data. The processor 210 may be implemented in, e.g., a system on chip (SoC). According to an embodiment of the present disclosure, the processor 210 may further include a graphic processing unit (GPU) and/or an image signal processor. The processor 210 may include at least some (e.g., the cellular module 221) of the components shown in FIG. 2. The processor 210 may load a command or data received from at least one of other components (e.g., a non-volatile memory) on a volatile memory, process the command or data, and store resultant data in the non-volatile memory.

The communication module 220 may have the same or similar configuration to the communication interface 170. The communication module 220 may include various communication circuitry, such as, for example, and without limitation, a cellular module 221, a wireless fidelity (Wi-Fi) module 223, a Bluetooth (BT) module 225, a GNSS module 227, a NFC module 228, and a RF module 229.

The cellular module 221 may provide voice call, video call, text, or Internet services through, e.g., a communication network. The cellular module 221 may perform identification or authentication on the electronic device 201 in the communication network using a subscriber identification module 224 (e.g., the SIM card). According to an embodiment of the present disclosure, the cellular module 221 may perform at least some of the functions providable by the processor 210. According to an embodiment of the present disclosure, the cellular module 221 may include a communication processor (CP). According to an embodiment of the present disclosure, at least some (e.g., two or more) of the cellular module 221, the Wi-Fi module 223, the Bluetooth module 225, the GNSS module 227, or the NFC module 228 may be included in a single integrated circuit (IC) or an IC package. The RF module 229 may communicate data, e.g., communication signals (e.g., RF signals).

The RF module 229 may include, e.g., a transceiver, a power amp module (PAM), a frequency filter, a low noise amplifier (LNA), or an antenna. According to an embodiment of the present disclosure, at least one of the cellular module 221, the Wi-Fi module 223, the bluetooth module 225, the GNSS module 227, or the NFC module 228 may communicate RF signals through a separate RF module. The subscription identification module 224 may include, e.g., a card including a subscriber identification module, or an embedded SIM, and may contain unique identification information (e.g., an integrated circuit card identifier (ICCID) or subscriber information (e.g., an international mobile subscriber identity (IMSI)).

The memory 230 (e.g., the memory 130) may include, e.g., an internal memory 232 and/or an external memory 234. The internal memory 232 may include at least one of, e.g., a volatile memory (e.g., a dynamic RAM (DRAM), a static RAM (SRAM), a synchronous dynamic RAM (SDRAM), etc.) or a non-volatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash, or a NOR flash), a hard drive, or solid state drive (SSD). The external memory 234 may include a flash drive, e.g., a compact flash (CF) memory, a secure digital (SD) memory, a micro-SD memory, a min-SD memory, an extreme digital (xD) memory, a multi-media card (MMC), or a Memory Stick™. The external memory 234 may be functionally or physically connected with the electronic device 201 via various interfaces.

For example, the sensor module 240 may measure a physical quantity or detect an operational state of the electronic device 201, and the sensor module 240 may convert the measured or detected information into an electrical signal. The sensor module 240 may include at least one of, e.g., a gesture sensor 240A, a gyro sensor 240B, an atmospheric pressure (e.g., air pressure) sensor 240C, a magnetic sensor 240D, an acceleration sensor 240E, a grip sensor 240F, a proximity sensor 240G, a color sensor 240H (e.g., a red-green-blue (RGB) sensor, a biometric sensor 240I, a temperature/humidity sensor 240J, an illumination sensor 240K, or an Ultra Violet (UV) sensor 240M. Additionally or alternatively, the sensing module 240 may include, e.g., an e-nose sensor, an electromyography (EMG) sensor, an electroencephalogram (EEG) sensor, an electrocardiogram (ECG) sensor, an infrared (IR) sensor, an iris sensor, or a finger print sensor. The sensor module 240 may further include a control circuit for controlling at least one or more of the sensors included in the sensing module. According to an embodiment of the present disclosure, the electronic device 201 may further include a processor configured to control the sensor module 240 as part of the processor 210 or separately from the processor 210, and the electronic device 2701 may control the sensor module 240 while the processor 210 is in a sleep mode.

The input unit 250 may include various input circuitry, such as, for example, and without limitation, a touch panel 252, a (digital) pen sensor 254, a key 256, or an ultrasonic input device 258. The touch panel 252 may use at least one of capacitive, resistive, infrared, or ultrasonic methods. The touch panel 252 may further include a control circuit. The touch panel 252 may further include a tactile layer and may provide a user with a tactile reaction. The (digital) pen sensor 254 may include, e.g., a part of a touch panel or a separate sheet for recognition. The key 256 may include e.g., a physical button, optical key or key pad. The ultrasonic input device 258 may sense an ultrasonic wave generated from an input tool through a microphone (e.g., the microphone 288) to identify data corresponding to the sensed ultrasonic wave.

The display 260 (e.g., the display 160) may include a panel 262, a hologram device 264, a projector 266, and/or a control circuit for controlling the same. The panel 262 may be implemented to be flexible, transparent, or wearable. The panel 262, together with the touch panel 252, may be configured in one or more modules. According to an embodiment of the present disclosure, the panel 262 may include a pressure sensor (or pose sensor) that may measure the strength of a pressure by the user's touch. The pressure sensor may be implemented in a single body with the touch panel 252 or may be implemented in one or more sensors separate from the touch panel 252. The hologram device 264 may make three dimensional (3D) images (holograms) in the air by using light interference. The projector 266 may display an image by projecting light onto a screen. The screen may be, for example, located inside or outside of the electronic device 201.

The interface 270 may include various interface circuitry, such as, for example, and without limitation, a high definition multimedia interface (HDMI) 272, a USB 274, an optical interface 276, or a D-subminiature (D-sub) 278. The interface 270 may be included in e.g., the communication interface 170 shown in FIG. 1. Additionally or alternatively, the interface 270 may include a mobile high-definition link (MHL) interface, a secure digital (SD) card/multimedia card (MMC) interface, or infrared data association (IrDA) standard interface.

The audio module 280 may converting, e.g., a sound signal into an electrical signal and vice versa. At least a part of the audio module 280 may be included in e.g., the input/output interface 145 as shown in FIG. 1. The audio module 280 may process sound information input or output through e.g., a speaker 282, a receiver 284, an earphone 286, or a microphone 288. For example, the camera module 291 may be a device for capturing still images and videos, and may include, according to an embodiment of the present disclosure, one or more image sensors (e.g., front and back sensors), a lens, an image signal processor (ISP), or a flash such as an LED or xenon lamp. The power manager module 295 may manage power of the electronic device 201, for example. According to an embodiment of the present disclosure, the power manager module 295 may include a power management Integrated circuit (PMIC), a charger IC, or a battery or fuel gauge. The PMIC may have a wired and/or wireless recharging scheme. The wireless charging scheme may include e.g., a magnetic resonance scheme, a magnetic induction scheme, or an electromagnetic wave based scheme, and an additional circuit, such as a coil loop, a resonance circuit, a rectifier, or the like may be added for wireless charging. The battery gauge may measure an amount of remaining power of the battery 296, a voltage, a current, or a temperature while the battery 296 is being charged. The battery 296 may include, e.g., a rechargeable battery or a solar battery.

The indicator 297 may indicate a particular state of the electronic device 201 or a part (e.g., the processor 210) of the electronic device, including e.g., a booting state, a message state, or recharging state. The motor 298 may convert an electric signal to a mechanical vibration and may generate a vibrational or haptic effect. The electronic device 201 may include a mobile TV supporting device (e.g., a GPU) that may process media data as per, e.g., digital multimedia broadcasting (DMB), digital video broadcasting (DVB), or mediaFlo™ standards. Each of the aforementioned components of the electronic device may include one or more parts, and a name of the part may vary with a type of the electronic device. According to various embodiments, the electronic device (e.g., the electronic device 201) may exclude some elements or include more elements, or some of the elements may be combined into a single entity that may perform the same function as by the elements before combined.

Figure 3:
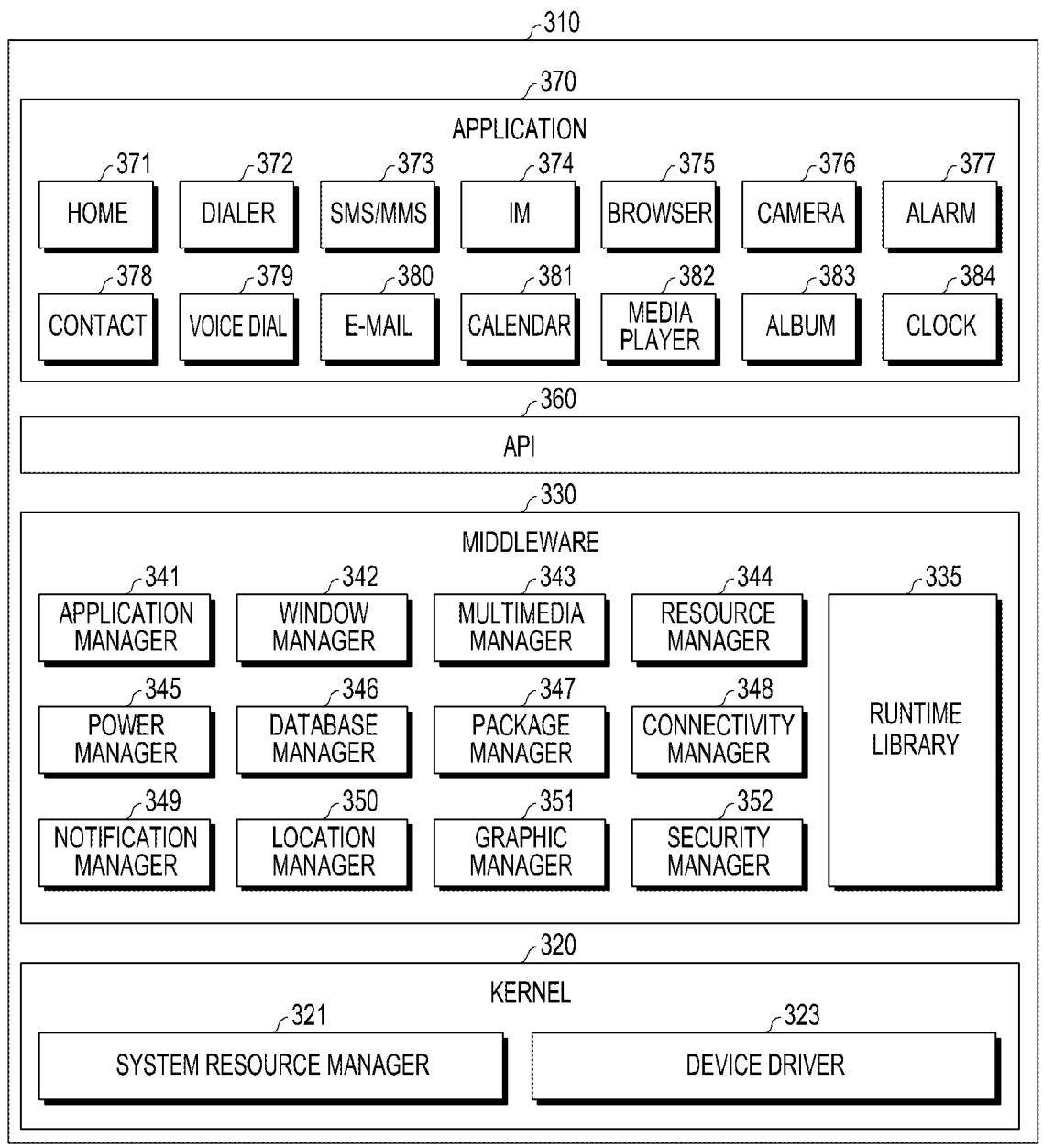
FIG. 3 is a block diagram illustrating an example program module according to an example embodiment of the present disclosure.

FIG. 3 is a block diagram illustrating an example program module according to an example embodiment of the present disclosure; According to an embodiment of the present disclosure, the program module 310 (e.g., the program 140) may include an operating system (OS) controlling resources related to the electronic device (e.g., the electronic device 101) and/or various applications (e.g., the application processor 147) driven on the operating system. The operating system may include, e.g., Android™, iOS™, Windows™, Symbian™, Tizen™, or Bada™.

Referring to FIG. 3, the program module 310 may include a kernel 320 (e.g., the kernel 141), middleware 330 (e.g., the middleware 143), an API 360 (e.g., the API 145), and/or an application 370 (e.g., the application program 147). At least a part of the program module 310 may be preloaded on the electronic device or may be downloaded from an external electronic device (e.g., the electronic devices 102 and 104 or server 106).

The kernel 320 may include, e.g., a system resource manager 321 or a device driver 323. The system resource manager 321 may perform control, allocation, or recovery of system resources. According to an embodiment of the present disclosure, the system resource manager 321 may include a process managing unit, a memory managing unit, or a file system managing unit. The device driver 323 may include, e.g., a display driver, a camera driver, a Bluetooth driver, a shared memory driver, a USB driver, a keypad driver, a Wi-Fi driver, an audio driver, or an inter-process communication (IPC) driver. The middleware 330 may provide various functions to the application 370 through the API 360 so that the application 370 may use limited system resources in the electronic device or provide functions jointly required by applications 370.

According to an embodiment of the present disclosure, the middleware 330 may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, or a security manager 352.

The runtime library 335 may include a library module used by a compiler in order to add a new function through a programming language while, e.g., the application 370 is being executed. The runtime library 335 may perform input/output management, memory management, or arithmetic function processing. The application manager 341 may manage the life cycle of, e.g., the applications 370. The window manager 342 may manage GUI resources used on the screen. The multimedia manager 343 may grasp formats necessary to play media files and use a codec appropriate for a format to perform encoding or decoding on media files. The resource manager 344 may manage the source code or memory space of the application 370. The power manager 345 may manage, e.g., the battery capability or power and provide power information necessary for the operation of the electronic device. According to an embodiment of the present disclosure, the power manager 345 may interwork with a basic input/output system (BIOS). The database manager 346 may generate, search, or vary a database to be used in the applications 370. The package manager 347 may manage installation or update of an application that is distributed in the form of a package file.

The connectivity manager 348 may manage, e.g., wireless connectivity. The notification manager 349 may provide an event, e.g., arrival message, appointment, or proximity alert, to the user. The location manager 350 may manage, e.g., locational information on the electronic device. The graphic manager 351 may manage, e.g., graphic effects to be offered to the user and their related user interface. The security manager 352 may provide system security or user authentication, for example. According to an embodiment of the present disclosure, the middleware 330 may include a telephony manager for managing the voice or video call function of the electronic device or a middleware module able to form a combination of the functions of the above-described elements. According to an embodiment of the present disclosure, the middleware 330 may provide a module specified according to the type of the operating system. The middleware 330 may dynamically omit some existing components or add new components.

The API 360 may be a set of, e.g., API programming functions and may have different configurations depending on operating systems. For example, in the case of Android or iOS, one API set may be provided per platform, and in the case of Tizen, two or more API sets may be offered per platform.

The application 370 may include an application that may provide, e.g., a home 371, a dialer 372, an SMS/MMS 373, an instant message (IM) 374, a browser 375, a camera 376, an alarm 377, a contact 378, a voice dial 379, an email 380, a calendar 381, a media player 382, an album 383, or a clock 384. Additionally or alternatively, though not shown, the application 370 may further include, for example, a heathcare (e.g., measuring the degree of workout or bloodsugar), or provision of environmental information (e.g., provision of air pressure, moisture, or temperature information).

According to an embodiment of the present disclosure, the application 370 may include an information exchanging application supporting information exchange between the electronic device and an external electronic device. Examples of the information exchange application may include, but is not limited to, a notification relay application for transferring specific information to the external electronic device, or a device management application for managing the external electronic device. For example, the notification relay application may transfer notification information generated by other application of the electronic device to the external electronic device or receive notification information from the external electronic device and provide the received notification information to the user. For example, the device management application may install, delete, or update a function (e.g., turn-on/turn-off the external electronic device (or some elements) or adjusting the brightness (or resolution) of the display) of the external electronic device communicating with the electronic device or an application operating on the external electronic device. According to an embodiment of the present disclosure, the application 370 may include an application (e.g., a healthcare application of a mobile medical device) designated according to an attribute of the external electronic device. According to an embodiment of the present disclosure, the application 370 may include an application received from the external electronic device. At least a portion of the program module 310 may be implemented (e.g., executed) in software, firmware, hardware (e.g., the processor 210), or a combination of at least two or more thereof and may include a module, program, routine, command set, or process for performing one or more functions.

Figure 4:
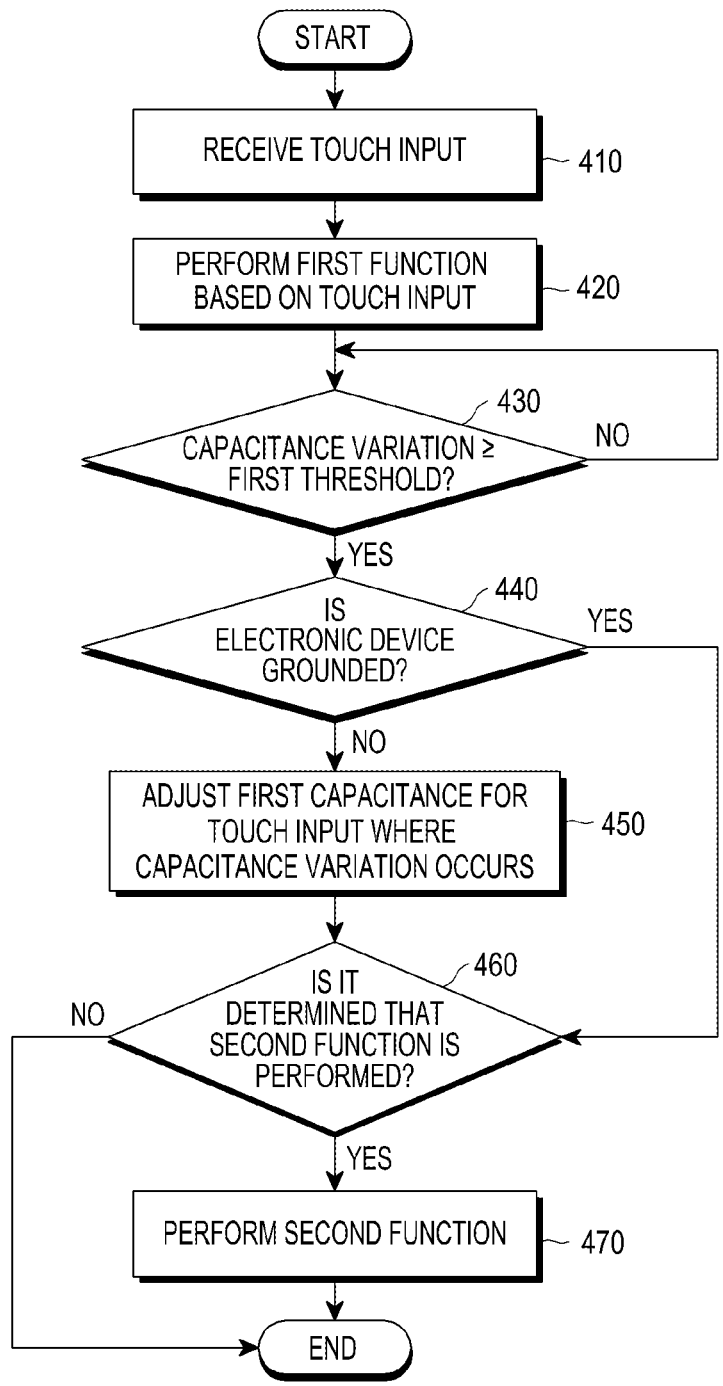
FIG. 4 is a flowchart illustrating an example method for processing a touch input by an electronic device according to an example embodiment of the present disclosure.

FIG. 4 is a flowchart illustrating an example method for processing a touch input by an electronic device according to an example embodiment of the present disclosure.

In operation 410, the electronic device 101 may receive a touch input by an external object through the touchscreen. In operation 420, the electronic device 101 may perform a first function based on the received touch input. The electronic device 101 may perform the first function corresponding to the touch input based on at least one of the position, direction, touch area, or touch strength of the received touch input. The electronic device 101 may recognize the position, direction, touch area, or touch strength of the touch input based on the capacitance for the touch input obtained through the touchscreen.

Figure 5A:
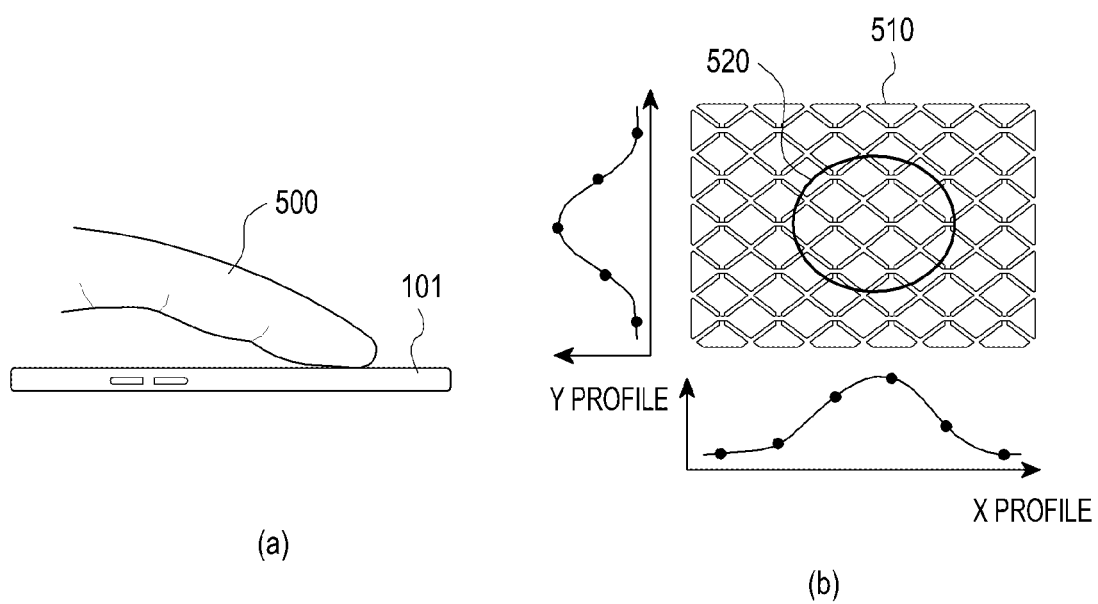
FIGS. 5A and 5B are diagrams illustrating an example method for detecting a touch input using a variation in capacitance by an electronic device according to an example embodiment of the present disclosure.

Referring to FIG. 5A, the electronic device 101 may detect a touch input by an external object through the touchscreen. For example, the user may touch the touchscreen of the electronic device 101 with his finger as illustrated in (a) of FIG. 5A. The electronic device 101 may recognize the position, direction, touch area, or touch strength of the touch input by the finger (500) touch using a variation in capacitance by touch through the finger (500).

For example, a touch panel 510 included in the touchscreen may be configured in a two-dimensional (2D) plane of a X profile and a Y profile, and alternating current (AC) voltage may be applied to the touch panel 510, as illustrated in (b) of FIG. 5A. Where the finger 500 contacts the touchscreen, the electronic device 101 may detect a variation in a capacitance for a touch area 520 of the touch panel 510 as illustrated in FIG. 5B.

Figure 5B:
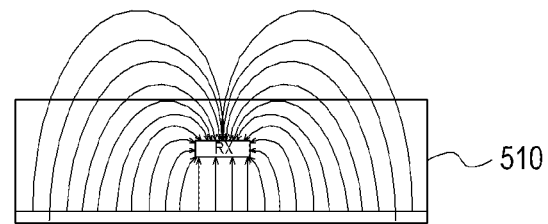
Figure 5B:
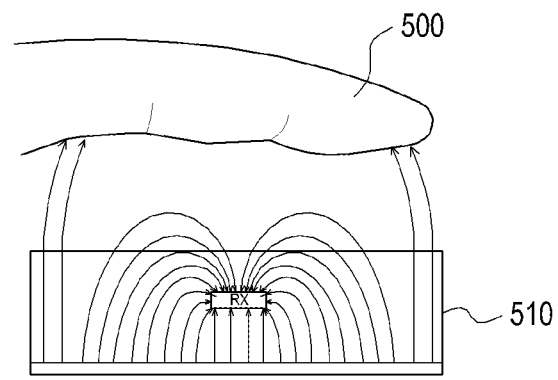
Figure 5B:
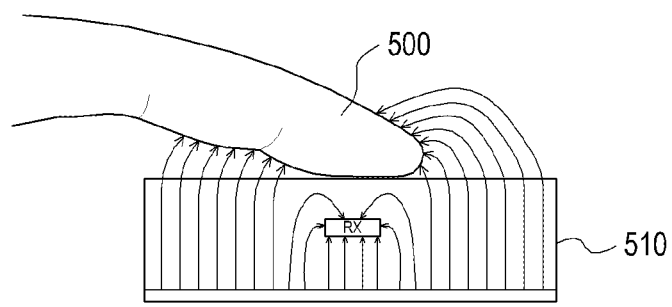

For example, referring to (a) of FIG. 5B, the touch panel 510 may remain in the state where the AC voltage is applied. Where an external object (e.g., the finger 500) approaches the touchscreen (e.g., the touch panel 510) as illustrated in (b) of FIG. 5B, the electronic device may detect a variation in the capacitance by the external object. Where the external object (e.g., the finger 500) contacts the touchscreen (e.g., the touch panel 510) as illustrated in (c) of FIG. 5B, the electronic device may detect a variation in the capacitance by the external object.

When the capacitance variation is detected to be equal to or more than a preset reference capacitance, the electronic device 101 may determine that the touch input has been detected. When the capacitance variation is detected to be less than a preset reference capacitance, the electronic device 101 may determine that the touch input has not been detected.

The electronic device 101 may also detect the touch area or touch strength of the touch input through the capacitance for the touch input. For example, the electronic device 101 may detect the touch area or touch strength of the touch input through, e.g., a variation in the capacitance for the touch input, a variation in the capacitance relative to a maximum capacitance, and a variation in the capacitance per unit time. As such, the electronic device 101 may distinct the touch input according to the touch area or touch strength of the touch input. The electronic device 101 may distinct the touch input according to the variation in the capacitance. For example, although a first touch input measured to have a first capacitance and a second touch input measured to have a second capacitance are detected at the same position, the electronic device 101 may distinctly or separately recognize the first touch input and the second touch input and enable a corresponding function to be performed.

In operation 430, the electronic device 101 may compare the variation in the capacitance for the touch input with a preset first threshold. For example, the first threshold may be set to be a variation in capacitance at which the phenomenon where a capacitance for a touch input is not precisely measured starts to occur, and the first threshold may be set considering the characteristics of the touchscreen.

In operation 440, when the variation in the capacitance for the touch input increases up to the preset first threshold or more, the electronic device 101 may determine whether the electronic device 101 is grounded.

Figures 6A, 6B:
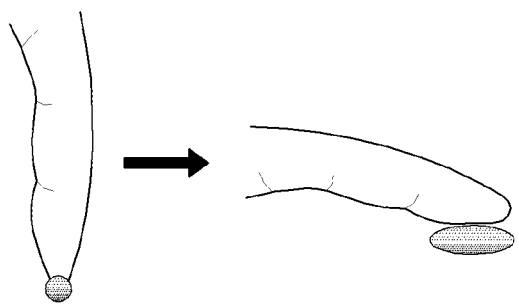
FIGS. 6A and 6B are diagrams illustrating an example process in which a capacitance variation occurs based on a variation in a touch area for a touch input according to an example embodiment of the present disclosure.

For example, referring to FIG. 6A, where the user tilts his finger from an upright position as illustrated in FIG. 6A to another position as illustrated in FIG. 6B, the touch area of the touch input by the finger may increase. During the course, the capacitance for the touch input may be increased, maintained as it is, or reduced.

Although not shown, the user may put more finger pressure on the display without changing the angle between the user's finger and the display. In such case, the strength of the touch input may increase, and so may the capacitance for the touch input. The touch area for the touch input may increase as well.

As such, as the capacitance for the touch input changes, e.g., as the capacitance for the touch input increases, the electronic device 101 may identify whether the electronic device 101 is in the floating state in order to determine whether such a phenomenon occurs that the capacitance for the touch input fails to be exactly measured. The electronic device 101 may determine whether the electronic device 101 is grounded in order to identify whether the electronic device 101 is in the floating state.

Figure 7A:
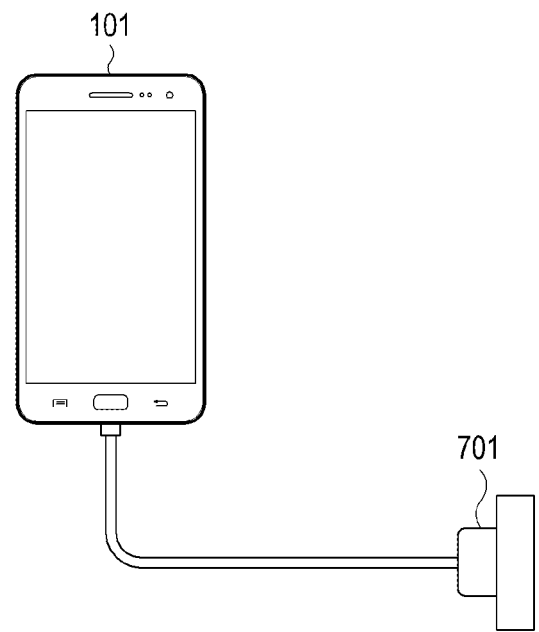
Figure 7B:
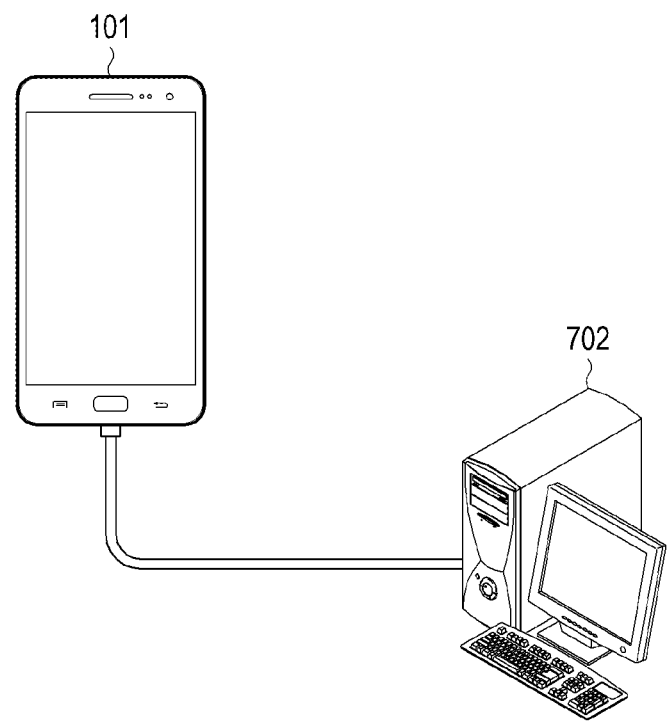

According to an embodiment of the present disclosure, where the electronic device 101 is connected with the charger 701 or another electronic device 702, the electronic device 101 may determine that the electronic device 101 is grounded as illustrated in FIGS. 7A and 7B. For example, where the electronic device 101 is connected with the charger 701 or the other electronic device 702, the electronic device 101 may determine that the electronic device 101 is grounded. The electronic device 101 may identify whether the electronic device 101 is connected with the charger 701 or the other electronic device 702 through an external connection terminal (e.g., a universal serial bus (USB) terminal) and may thus determine that the electronic device 101 is grounded.

Upon determining that the electronic device 101 is grabbed by the user's hand 703 or contacted by a conductive object 704 through at least one sensor, the electronic device 101 may determine that the electronic device 101 is grounded as illustrated in FIGS. 7C and 7D. For example, upon determining that the electronic device 101 is grabbed by the user's hand 703 or contacted by the conductive object 704, the electronic device 101 may determine that the electronic device 101 is grounded. Upon considering that a user holds the electronic device 101 through a sensing value obtained through at least one sensor, the electronic device 101 may determine that the electronic device 101 is grounded.

In operation 450, upon determining that the electronic device 101 is not grounded, the electronic device 101 may adjust a first capacitance for the touch input where the variation in capacitance occurs.

For example, where the electronic device 101 is in the floating state, e.g., the electronic device 101 is not grounded, and the variation in the capacitance for the touch input is equal to or more than the first threshold, such a phenomenon occurs that the capacitance for the touch input fails to be precisely measured as illustrated in FIG. 8A and FIG. 8B.

FIG. 8A is a graph relatively illustrating the measured capacitance for the touch input where a capacitance variation has occurred, wherein different colors are marked depending on measurements of the capacitance. As illustrated in FIG. 8A, a center area 810 of the touch input where the capacitance variation has occurred is marked in a different color from that for a surrounding area 811 of the touch input where the capacitance variation has occurred, meaning that the capacitance of the center area 810 is measured to be lower than the capacitance of the surrounding area 811. In case of a capacitance measured for a normal touch input, the capacitance of the center area is measured to be higher than the capacitance of the surrounding area.

FIG. 8B is a graph representing capacitance measurements for touch inputs in numerical values. FIG. 8B also indicates that the center area 820 is measured in a lower capacitance as compared with the surrounding area 821. The center area 820 is an area corresponding to a center of the touch input where the capacitance variation has occurred. For a typical touch input, the center area is measured to have a higher capacitance than the surrounding area.

As such, where the electronic device 101 is in the floating state, e.g., the electronic device 101 is not grounded, and the variation in the capacitance for the touch input is equal to or more than the first threshold, such a phenomenon occurs that the capacitance for the touch input fails to be precisely measured.

Thus, upon determining that the electronic device 101 is not grounded, the electronic device 101 may adjust a first capacitance for the touch input where the variation in capacitance occurs.

A method for adjusting a first capacitance for a touch input where a capacitance variation has occurred is described in greater detail below with reference to FIGS. 9 to 12.

Figure 9:
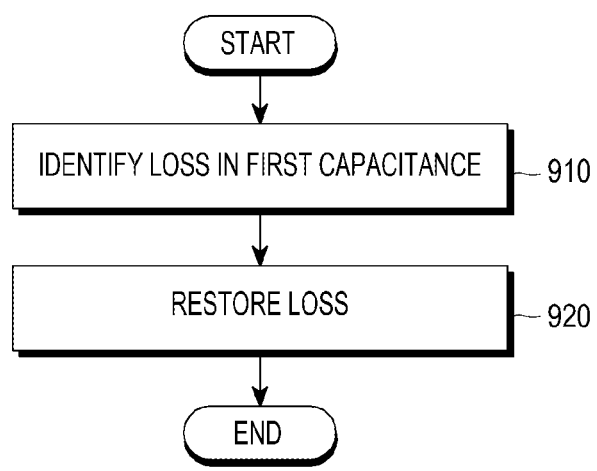
FIG. 9 is a flowchart illustrating an example method for adjusting a capacitance for a touch input by an electronic device according to an example embodiment of the present disclosure.

Referring to FIG. 9, the electronic device 101 may identify a loss in the first capacitance for the touch input where the capacitance variation has occurred in operation 910. For example, where the electronic device 101 is not grounded, and the variation in the capacitance for the touch input is equal to or more than a first threshold, the first capacitance may be represented in a graph whose peak is flat or depressed as illustrated in (a) of FIG. 10A. The electronic device 101 may identify that the loss in the first capacitance, e.g., the flat or depressed peak of the graph, is a loss in the first capacitance so that the first capacitance may be represented in a graph whose peak is raised up as illustrated in (b) of FIG. 10A. However, such types of graphs are merely an example for description purposes alone, and embodiments of the present disclosure are not limited thereto. The loss in the first capacitance may be represented in various manners depending on the type of the graph.

In operation 920, the electronic device 101 may restore the loss in the first capacitance that is identified in operation 910. The electronic device 101 may adjust the first capacitance by restoring the identified loss in the first capacitance.

Figure 10A:
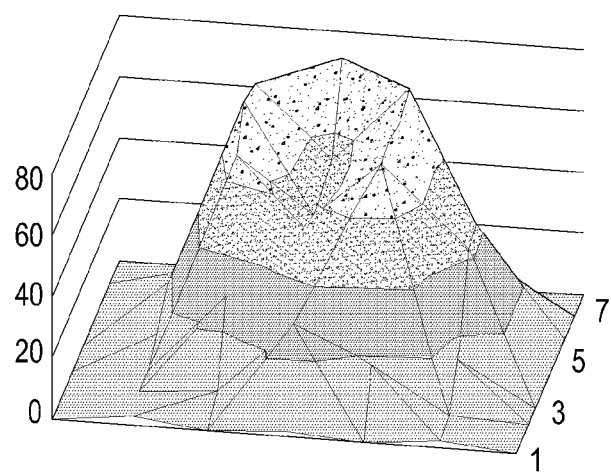
FIGS. 10A and 10B are diagrams illustrating an example method for adjusting a capacitance for a touch input by an electronic device according to an example embodiment of the present disclosure.
Figure 10A:
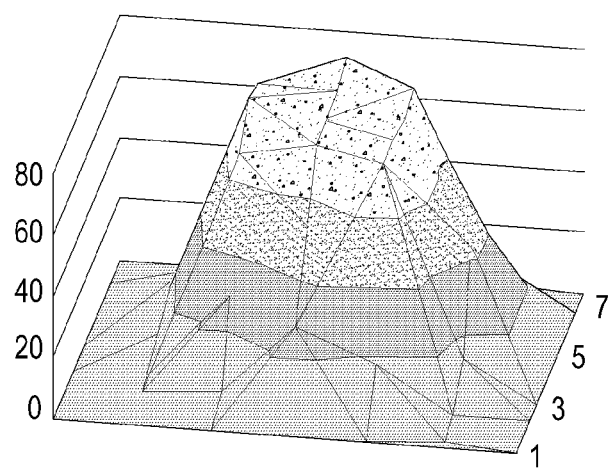
Figure 10B:
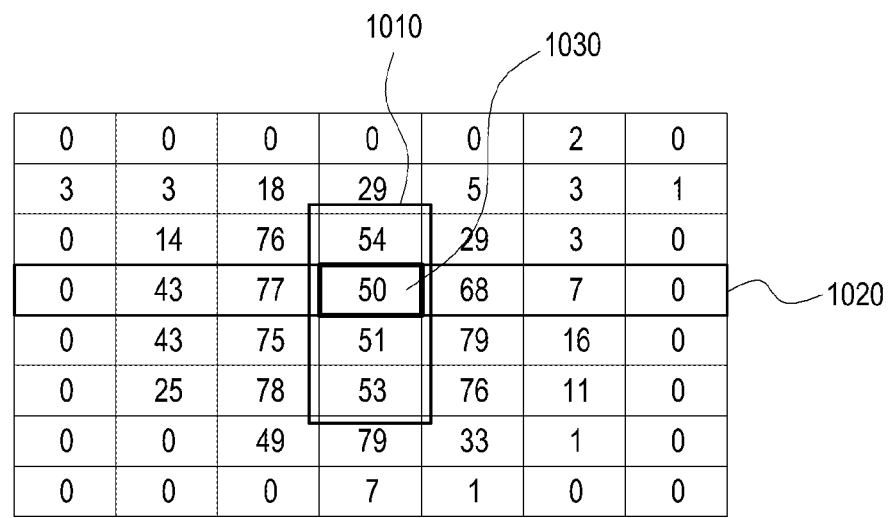
Figure 10B:
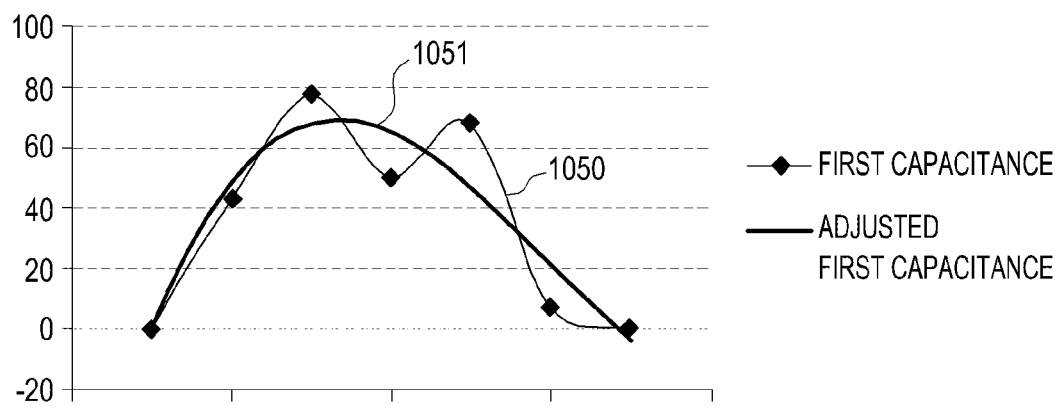

For example, as illustrated in (a) of FIG. 10B, the electronic device 101 may identify that, of the first capacitance for the touch input where the capacitance variation has occurred, the capacitance 1010 for the center area of the touch input is lower than the capacitance of the surrounding area. The electronic device 101 may identify that the capacitance 1010 for the center area of the touch input where the capacitance variation has occurred, which is measured to be lower than the capacitance of the surrounding area, is a loss.

In this case, the electronic device 101 may restore the capacitance 1010 for the center area, which is the loss, by applying a preset algorithm for each capacitance having the same y coordinate to the first capacitance for the touch input where the capacitance variation has occurred and is shown as illustrated in (a) of FIG. 10B.

Described below is a method for restoring the capacitance 1030 of a fourth row of center area by applying the preset algorithm to the capacitance 1020 corresponding to the fourth row of the first capacitance as illustrated in (a) of FIG. 10B.

Referring to (b) of FIG. 10B, the capacitance corresponding to the fourth row may be represented in a first graph 1050. The electronic device 101 may restore the capacitance 1020 corresponding to the fourth row and resultantly the capacitance 1030 of the fourth area of center area by applying a preset algorithm, e.g., a curve fitting algorithm (Gaussian fitting algorithm), to the capacitance 1020 corresponding to the fourth row. As the capacitance 1030 of the fourth row of center area is restored, the adjusted capacitance corresponding to the fourth row may be represented in a second graph 1051.

The electronic device 101 may restore the capacitance 1010 for the center area, which is a loss, by performing the above restoring process on each row. By doing so, the electronic device 101 may restore the capacitance 1010 for the center area, which is a loss, to be approximate to the actual capacitance. The electronic device 101 may adjust the first capacitance with the restored capacitance.

As such, the electronic device 101 may identify the loss for the first capacitance and proceed with the restoration process based on the identified loss. Thus, the electronic device 101 may more precisely restore the loss.

Figure 11:
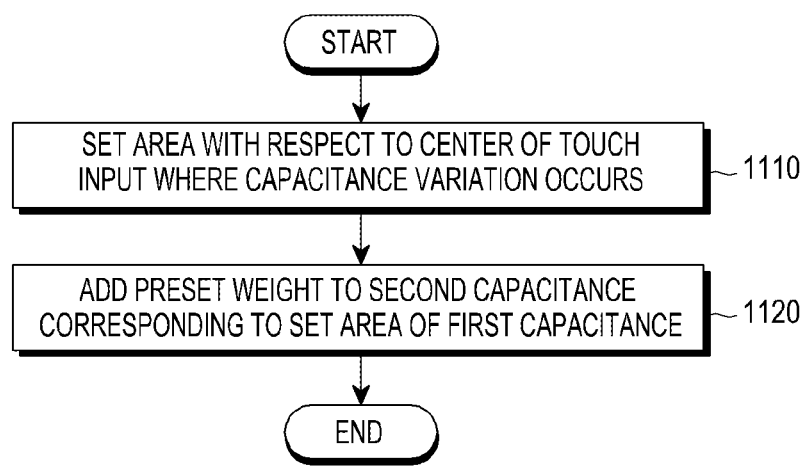
FIG. 11 is a flowchart illustrating an example method for adjusting a capacitance for a touch input by an electronic device according to an example embodiment of the present disclosure.

Referring to FIG. 11, in operation 1110, the electronic device 101 may set an area with respect to the center of the touch input where the capacitance variation has occurred. The electronic device 101 may set an area whose capacitance is to be adjusted with respect to the center of the touch input where the capacitance variation has occurred given that such a phenomenon that capacitance is not precisely measured occurs in the center area of the touch input where the capacitance variation has occurred.

Figure 12A:
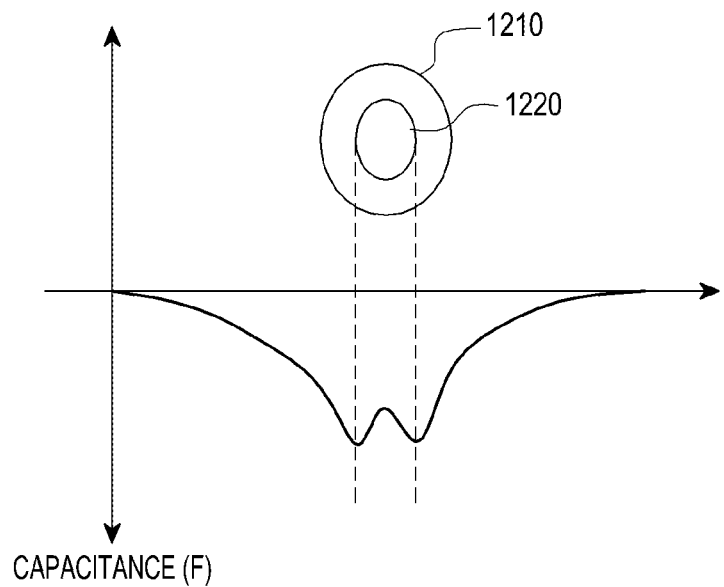
FIGS. 12A and 12B are diagrams illustrating an example method for adjusting a capacitance for a touch input by an electronic device according to an example embodiment of the present disclosure.

As illustrated in FIG. 12A, the capacitance for the center area 1220 of the touch input 1210 where the capacitance variation has occurred may not precisely be measured, and the capacitance of the center area 1220 may be measured to be lower than the capacitance of the surrounding area.

Figure 12B:
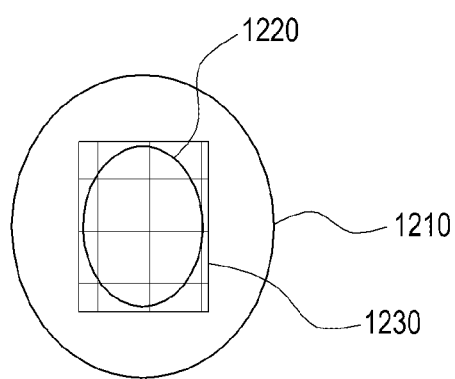

Accordingly, as illustrated in FIG. 12B, the electronic device 101 may set an area 1230 whose capacitance is to be adjusted with respect to the center area 1220 of the touch input 1210 where the capacitance variation has occurred.

In operation 1120, the electronic device 101 may adjust the first capacitance by adding a preset weight to a second capacitance corresponding to the area set in operation 1110 of the first capacitance.

For example, the electronic device 101 may identify the second capacitance corresponding to the area 1230 whose capacitance is to be adjusted in FIG. 12B and add the preset weight to the identified second capacitance corresponding to the area 1230 whose capacitance is to be adjusted. For example, the weight may be set predicting the occurrence of such a phenomenon that the capacitance is not precisely measured in the center area and considering the characteristics of the electronic device 101.

In operation 460, the electronic device 101 may determine whether to perform a second function according to the touch input where the variation in capacitance has occurred based on the first capacitance adjusted in operation 450. The second function may be a function different from the first function that was performed according to the touch input before the capacitance variation occurs.

Figure 13:
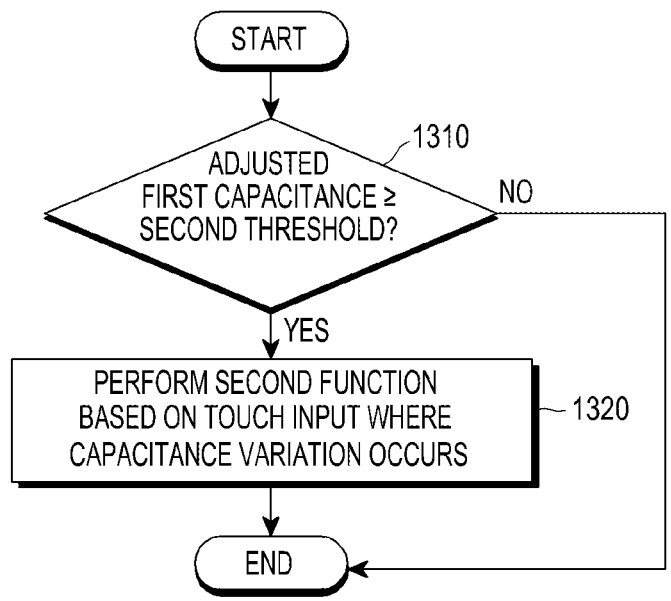
FIG. 13 is a flowchart illustrating an example method for determining whether a second function is performed by an electronic device according to an example embodiment of the present disclosure.

Referring to FIG. 13, in operation 1310, the electronic device 101 may compare the adjusted first capacitance with a preset second threshold. Where the adjusted first capacitance is equal to or more than the preset second threshold, the electronic device 101, in operation 1320, may determine to perform the second function based on the touch input where the capacitance variation has occurred. When the adjusted first capacitance is less than the preset second threshold, the electronic device 101 may determine not to perform the second function.

Figure 14:
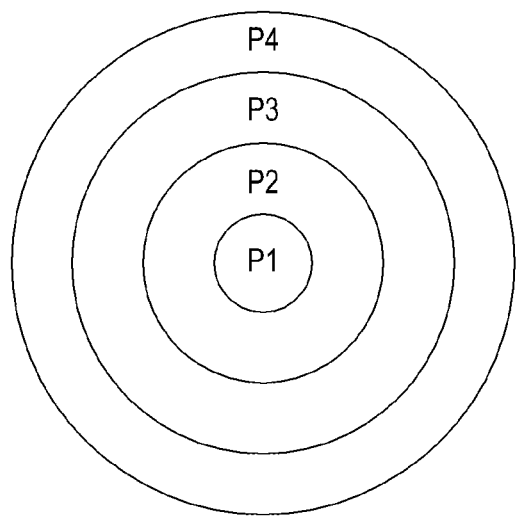
FIG. 14 is a diagram illustrating example references for determining whether a function is performed by an electronic device according to an example embodiment of the present disclosure.

For example, the electronic device 101 may enable various functions to be performed based on the capacitance for the received touch input. Referring to FIG. 14, the electronic device 101 may perform one of a first function P1, a second function P2, a third function P3, and a fourth function P4 based on the capacitance of the received touch input. For example, where the capacitance of the received touch input is equal to or more than a threshold A and less than a threshold B, the electronic device 101 may perform the first function P1. Where the capacitance of the received touch input is equal to or more than the threshold B and less than a threshold C, the electronic device 101 may perform the second function P2.

As such, the electronic device 101 may enable a corresponding function to be performed according to the capacitance of the received touch input. However, where each threshold used to determine whether a particular function is performed applies likewise regardless of the characteristics of each person, the user's intended function might not exactly be performed depending on the characteristics of the user.

For example, the magnitude or variation in the capacitance occurring when each user touches the touchscreen may differ per user due to finger resistances that may come from differences in each user's finger touch or finger size and thickness. Further, the angle at which the user touches the touchscreen whenever he uses the electronic device 101 may differ, and the size of the touch area may be varied depending on which finger is to be used to touch. If the electronic device 101 determines whether to perform a particular function through a fixed threshold even in such case, the capacitance for the touch input might not precisely be measured, resulting in a failure to exactly recognize the user's intended touch input. Therefore, the user's intended function might not exactly be performed. Hence, the threshold used to determine whether to perform a particular function may be reset per user or whenever entering a touch input.

According to an embodiment of the present disclosure, the electronic device 101 may set the second threshold used to determine whether to use the second function using at least one of an angle between the touchscreen and the external object, which is calculated based on the capacitance, or a variation in the capacitance for the touch input, which is obtained for a preset time.

For example, the electronic device 101 may store the variation in the capacitance for the touch input whenever the touch input is received or for a preset time. For example, the preset time may be a fixed time or may also be varied depending on, e.g., the circumstance where the touch input is received, the capacitance for the touch input, touch area, or touch strength.

For example, the electronic device 101 may measure the variation in the capacitance for the touch input for the preset time and store the measured capacitance variation in a frame buffer including N frames.

The electronic device 101 may measure the variation in the capacitance for the touch input and calculate a slope of the capacitance variation which is predicted when the area of the touch input is varied. The electronic device 101 may set the second threshold based on the calculated slope. The following description focuses primarily on a method for setting the second threshold through the variation in the capacitance for the touch input, but embodiments of the present disclosure are not limited thereto. The electronic device 101 may also set the second threshold through the variation in the touch area for the touch input.

Figure 15A:
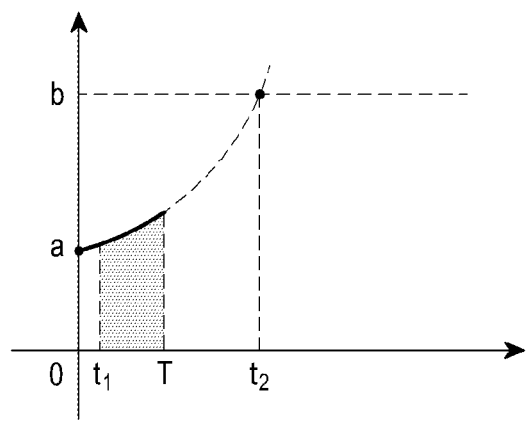
FIGS. 15A and 15B are diagrams illustrating an example method for setting a threshold that is used to determine whether a second function is performed according to an example embodiment of the present disclosure.

Referring to FIG. 15A, the electronic device 101 may detect the touch input when the capacitance for the touch input becomes a first threshold (a) with respect to the time when the user's finger touches the touchscreen. For example, the electronic device 101 may identify that the capacitance for the touch input becomes equal to or more than the first threshold (a) at time t1 and detect the touch input. The electronic device 101 may obtain the variation in the capacitance for the touch input for a preset time T after detecting the touch input. The electronic device 101 may set a second threshold (b) at a preset time t2 according to the obtained variation in the capacitance for the touch input.

For example, where the slope calculated according to the variation in the capacitance for the touch input is smaller than a preset reference, the electronic device 101 may determine that the variation in the capacitance by the touch input is small and let the second threshold (b) smaller than the preset second threshold. Where the calculated slope is larger than the preset reference, the electronic device 101 may determine that the variation in the capacitance by the touch input is large and let the second threshold (b) larger than the preset second threshold.

The electronic device 101 may also set the second threshold through the angle between an external object and the touchscreen, which is calculated based on the capacitance for the touch input.

Figure 15B:
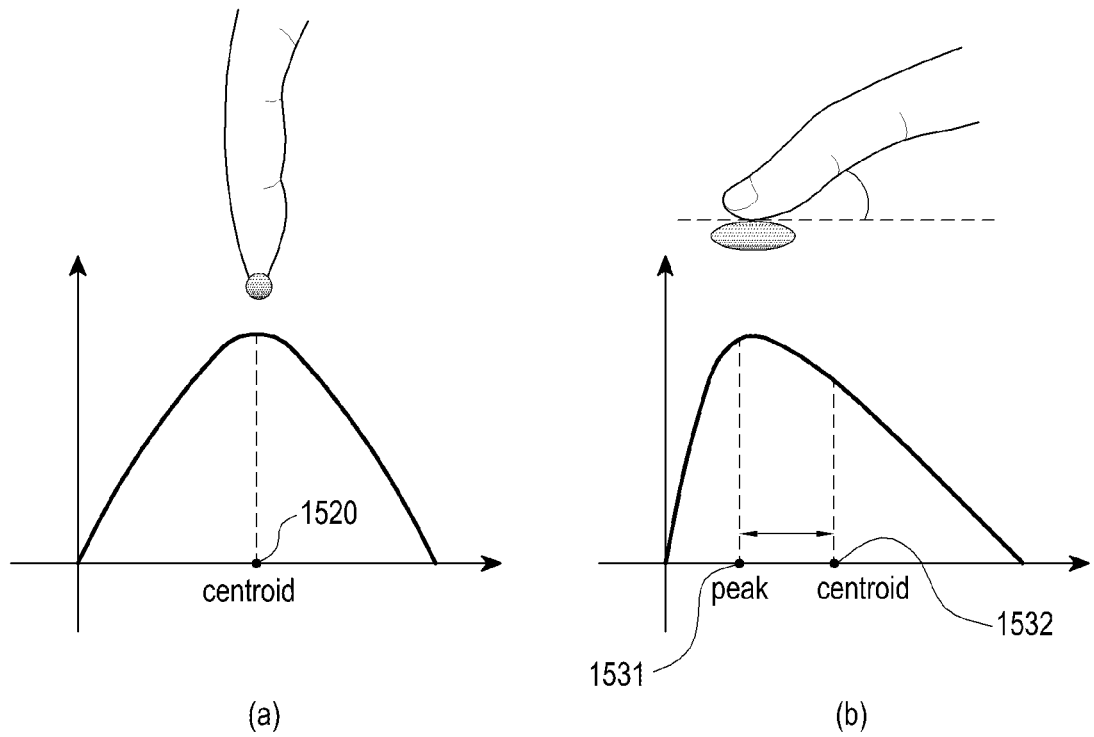

Referring to FIG. 15B, where the peak position indicating the peak of the capacitance for the touch input and the centroid position indicating the center of the touch input are consistent with each other as a first point 1520 as illustrated in (a) of FIG. 15B, the electronic device 101 may determine that the angle between the touchscreen and the external object is about 90 degrees. Unless a second point 1531, which is the peak position, is consistent with a third point 1532, which is the centroid position, as illustrated in (b) of FIG. 15B, the electronic device 101 may calculate the angle between the touchscreen and the external object through a difference between the second point 1531 and the third point 1532.

The electronic device 101 may determine the second threshold through the calculated angle between the touchscreen and the external object. For example, the electronic device 101 may determine that the larger angle between the touchscreen and the external object is, the larger variation in the touch area will be and set the second threshold (b) to be larger than a preset second threshold. Further, the electronic device 101 may determine that the smaller angle between the touchscreen and the external object is, the smaller variation in the touch area will be and set the second threshold (b) to be smaller than a preset second threshold.

As such, the electronic device 101 may reset the threshold used to determine whether to perform a particular function per user or whenever the user performs touch input.

In operation 470, when the second function is determined to be performed, the electronic device 101 may perform the second function based on the touch input where the capacitance variation has occurred.

Figure 16:
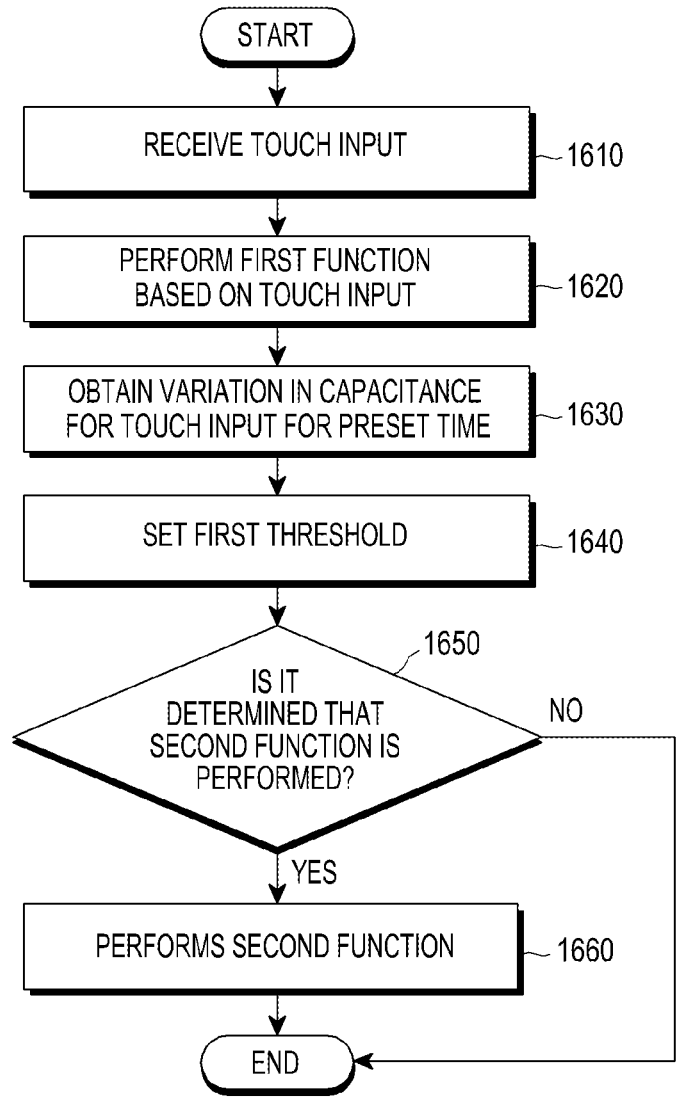
FIG. 16 is a flowchart illustrating an example method for processing a touch input by an electronic device according to an example embodiment of the present disclosure.

FIG. 16 is a flowchart illustrating an example method for processing a touch input by an electronic device according to an example embodiment of the present disclosure.

In operation 1610, the electronic device 101 may receive a touch input by an external object through the touchscreen. In operation 1620, the electronic device 101 may perform a first function according to the received touch input. The electronic device 101 may perform the first function corresponding to the touch input based on at least one of the position, direction, touch area, or touch strength of the received touch input. The electronic device 101 may recognize the position, direction, touch area, or touch strength of the touch input as per the capacitance for the touch input obtained through the touchscreen.

In operation 1630, the electronic device 101 may obtain the variation in the capacitance for the touch input for a preset time.

In operation 1640, the electronic device 101 may set a first threshold used to determine whether to perform a second function different from the first function based on the obtained variation in the capacitance for the touch input. The electronic device 101 may also set the first threshold considering the angle between an external object and the touchscreen, which is calculated based on the first capacitance, as well as the variation in the first capacitance. A method for setting the first threshold is the same as the method for setting the second threshold described above in connection with FIGS. 15a and 15b, and no further detailed description thereof is presented.

In operation 1650, when the capacitance for the touch input is changed, the electronic device 101 may determine whether to perform the second function by comparing the first capacitance for the touch input whose capacitance has been changed with the first threshold set in operation 1640. This will be described in greater detail below with reference to FIG. 17.

Where the first capacitance for the touch input whose capacitance has been changed is equal to or more than the first threshold, the electronic device 101, in operation 1660, may determine to perform the second function and perform the second function.

Figure 17:
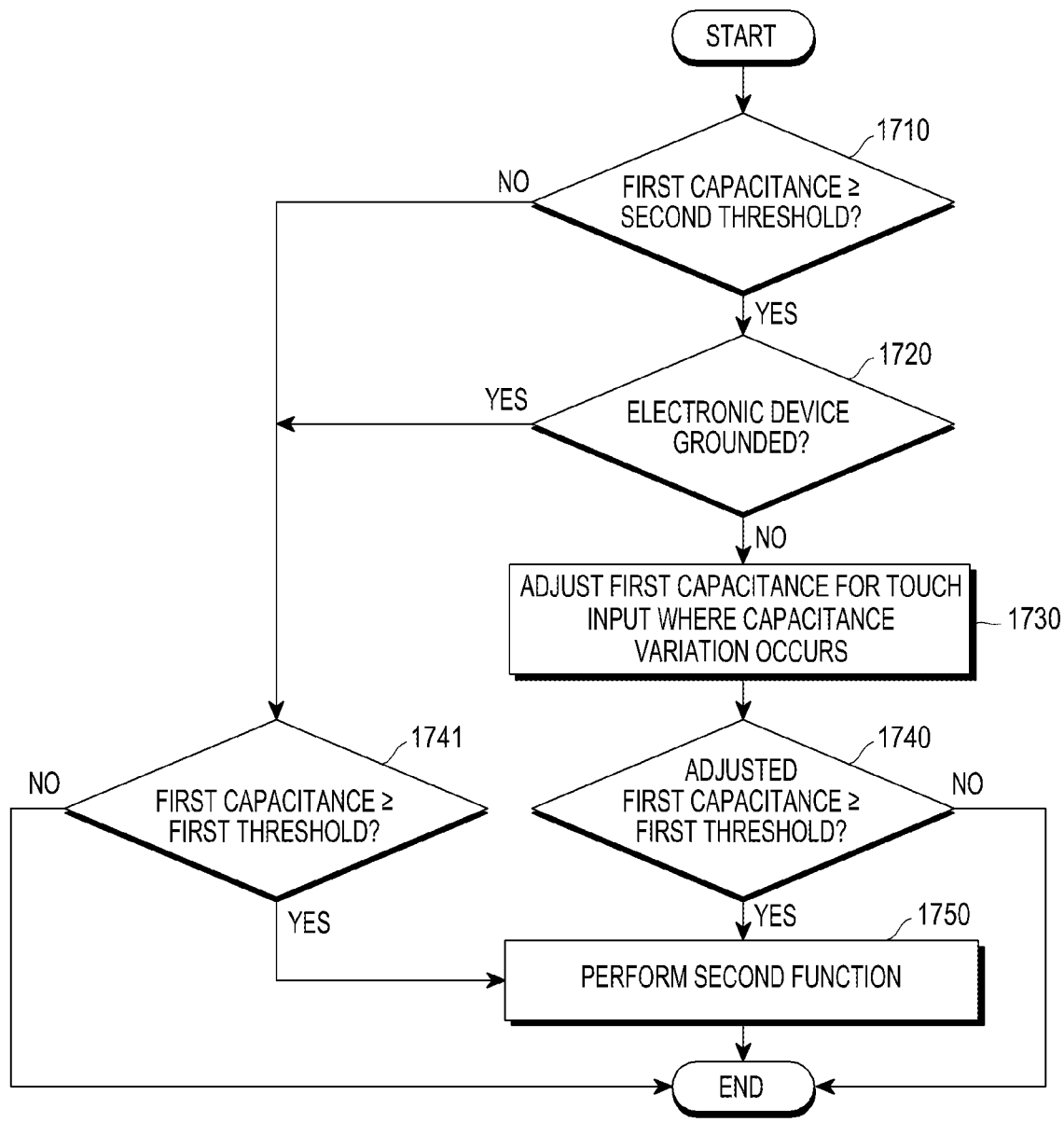
FIG. 17 is a flowchart illustrating an example method for determining whether a second function is performed by an electronic device according to an example embodiment of the present disclosure.

FIG. 17 is a flowchart illustrating an example method for determining whether a second function is performed by an electronic device according to an example embodiment of the present disclosure.

When the capacitance for the touch input is changed after setting the first threshold in operation 1640, the electronic device 101, in operation 1710, may determine whether the variation in the capacitance for the touch input has been increased to a second threshold or more. Here, the second threshold may be set to be a variation in capacitance at which the phenomenon where a capacitance for a touch input is not precisely measured starts to occur, and the first threshold may be set considering the characteristics of the touchscreen.

For example, where the variation in the capacitance for the touch input is less than the second threshold, the electronic device 101 may abstain from adjusting the first capacitance of the touch input where the capacitance variation has occurred. Thus, in operation 1741, the electronic device 101 may determine whether to perform the second function by comparing the set first threshold with the first capacitance for the touch input where the capacitance variation has occurred. The electronic device 101 may perform the second function, when the first capacitance for the touch input where the capacitance variation has occurred is equal to or more than the set first threshold.

When the variation in the capacitance for the touch input has increased to the second threshold or more, the electronic device 101, in operation 1720, may determine whether the electronic device 101 is grounded. A specific method for determining whether the electronic device 101 is grounded is the same as what has been described above in connection with FIGS. 7A to 7D, and no further description thereof is given.

For example, upon determining that the electronic device 101 is grounded, the electronic device 101 may abstain from adjusting the first capacitance of the touch input where the capacitance variation has occurred. Thus, in operation 1741, the electronic device 101 may determine whether to perform the second function by comparing the set first threshold with the first capacitance for the touch input where the capacitance variation has occurred.

In operation 1730, upon determining that the electronic device 101 is not grounded, the electronic device 101 may adjust a first capacitance for the touch input where the variation in capacitance occurs. A specific method for adjusting the first capacitance by the electronic device 101 has been described above in connection with FIGS. 9 to 12, and no further description thereof is provided below.

In operation 1740, the electronic device 101 may compare the first threshold set in operation 1630 with the first capacitance for the touch input where the capacitance variation has occurred in order to determine whether to perform the second function.

When the first capacitance is equal to or more than the first threshold, the electronic device 101, in operation 1750, may perform the second function.

FIGS. 18A, 18B, 18C and 19 are diagrams illustrating an example process in which different functions are performed depending on variations in the area of a touch input by an electronic device according to an example embodiment of the present disclosure.

According to an embodiment of the present disclosure, the electronic device 101 may perform various functions according to the capacitance for the touch input.

Figure 18A:
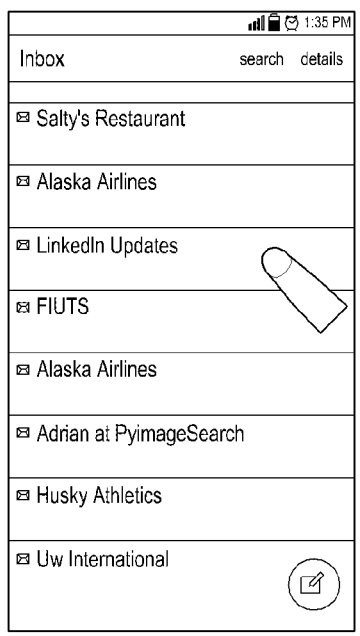
FIGS. 18A, 18B, 18C and 19 are diagrams illustrating an example process in which different functions are performed depending on variations in the capacitance of a touch input by an electronic device according to an example embodiment of the present disclosure.
Figure 18B:
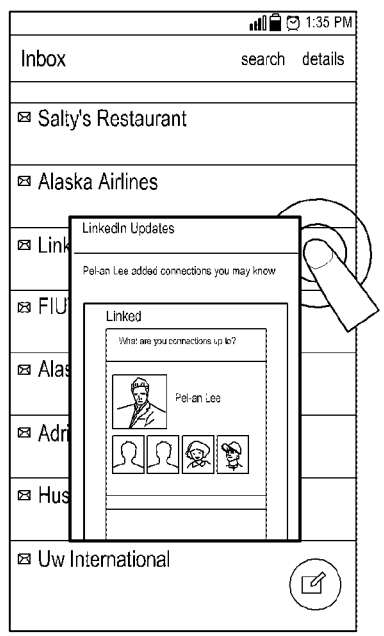
Figure 18C:
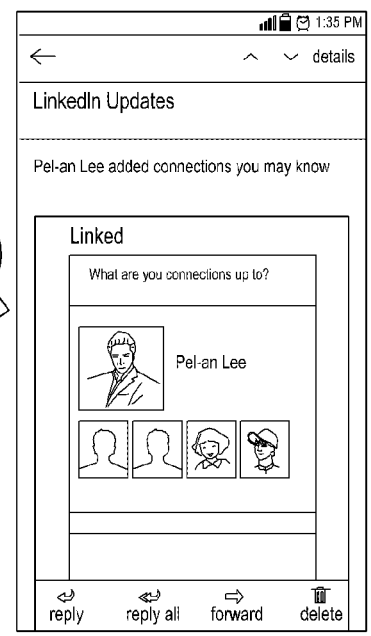

For example, referring to FIG. 18, the electronic device 101 may display received email items as illustrated in FIG. 18A. Upon receiving a touch input measured to have a first capacitance, the electronic device 101 may display a preview for a first email selected by the touch input as illustrated in FIG. 18B. Where the capacitance for the touch input increases from the first capacitance to a second capacitance, the electronic device 101 may display the whole content of the first email as illustrated in FIG. 18C.

Figure 19:
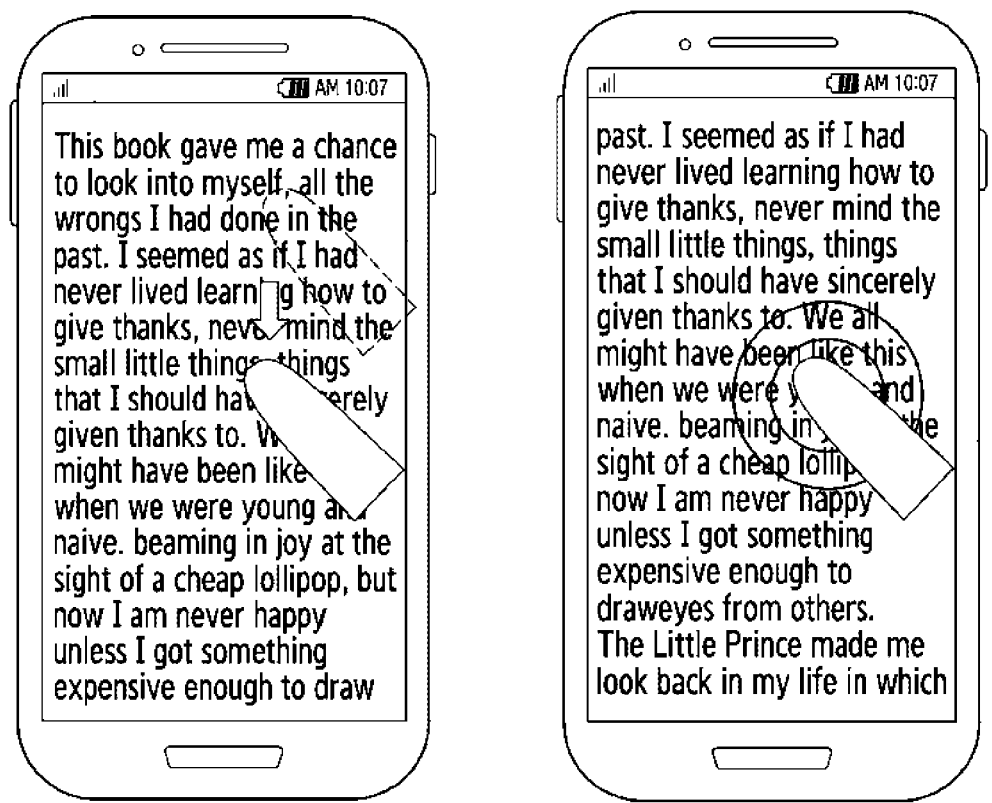

For example, referring to FIG. 19, the electronic device 101 may display text as illustrated in FIG. 19. Upon receiving a downward touch input measured to have the first capacitance, the electronic device 101 may perform a scrolling function. Where the capacitance for the touch input increases from the first capacitance to the second capacitance, the electronic device 101 may adjust (e.g., increase or decrease) the scrolling speed as illustrated in FIG. 19. Although not shown, the electronic device 101 may further increase or reduce, or stop scrolling when the capacitance for the touch input increases from the second capacitance to a third capacitance.

As such, the electronic device 101 may perform various functions based on the capacitance for the touch input. Hence, the electronic device 101 may adjust the capacitance for the touch input where the capacitance variation has occurred or set a threshold used to determine whether to perform a particular function to fit the user's characteristics as described above in order to exactly perform the user's intended function.

Each of the aforementioned components of the electronic device may include one or more parts, and a name of the part may vary with a type of the electronic device. The electronic device in accordance with various embodiments of the present disclosure may include at least one of the aforementioned components, omit some of them, or include other additional component(s). Some of the components may be combined into an entity, but the entity may perform the same functions as the components may do.

As used herein, the term "module" includes a unit configured in hardware, software, or firmware or any combination thereof, and may be interchangeably used with other term, e.g., a logic, logic block, part, or circuit. The module may be a single integral part or a minimum unit or part of performing one or more functions. The module may be implemented mechanically or electronically and may include, for example, and without limitation, a dedicated processor, a CPU, an application-specific integrated circuit (ASIC) chip, field-programmable gate arrays (FPGAs), or programmable logic device, that has been known or to be developed in the future as performing some operations.

According to an embodiment of the present disclosure, at least a part of the device (e.g., modules or their functions) or method (e.g., operations) may be implemented as instructions stored in a computer-readable storage medium (e.g., the memory 130), e.g., in the form of a program module. The instructions, when executed by a processor (e.g., the processor 120), may enable the processor to carry out a corresponding function.

The computer-readable medium may include, e.g., a hard disk, a floppy disc, a magnetic medium (e.g., magnetic tape), an optical recording medium (e.g., CD-ROM, DVD, magnetic-optical medium (e.g., floptical disk), or an embedded memory. The instruction may include a code created by a compiler or a code executable by an interpreter. Modules or programming modules in accordance with various embodiments of the present disclosure may include at least one or more of the aforementioned components, omit some of them, or further include other additional components. Operations performed by modules, programming modules or other components in accordance with various embodiments of the present disclosure may be carried out sequentially, in parallel, repeatedly or heuristically, or at least some operations may be executed in a different order or omitted or other operations may be added.

According to an embodiment of the present disclosure, a non-transitory computer-readable recording medium is provided, the non-transitory computer-readable recording medium having stored thereof a program to be executed on a computer, wherein the program may comprise commands executed by a processor to enable the processor to perform a first function according to a touch input made by a received external object, determine whether an electronic device is grounded when a variation in a capacitance for the touch input increases to a preset first threshold or more, adjust a first capacitance for the touch input where the capacitance variation occurs when the electronic device is determined not to be grounded, and determine whether to perform a second function according to the touch input where the capacitance variation occurs based on the adjusted first capacitance.

As is apparent from the foregoing description, according to various example embodiments of the present disclosure, the electronic device may enable a user's intended function to be more precisely performed by adjusting the capacitance for a touch input with the electronic device not grounded and allowing different functions to be performed based on the capacitance of touch inputs under the reference that has been set to reflect the respective characteristics of users.

The various example embodiments disclosed herein are provided for description and understanding of the disclosed technology and do not limit the scope of the present disclosure. Accordingly, the scope of the present disclosure should be understood as including all changes or variations of the embodiments based on the technical spirit of the present disclosure.

What is claimed is:
1. An electronic device, comprising:
 a touch screen;
 a memory configured to store instructions; and
 at least one processor coupled to the touch screen and the memory, wherein upon execution of the stored instructions, the at least one processor is configured to:
  perform a first function according to a first touch input made by an external object and received through the touch screen, identify whether the electronic device is grounded when a first capacitance of the first touch input increases to a second capacitance during a preset time, adjust the second capacitance when the electronic device is identified not to be grounded, based on the adjusted second capacitance being equal to or more than a threshold for a second touch input, perform a second function according to the second touch input corresponding to the adjusted second capacitance, and wherein the instructions are further executable by the at least one processor to identify a loss in the second capacitance and adjust the second capacitance by restoring the identified loss.

2. The electronic device of claim 1, wherein when the electronic device is connected with another electronic device or a charger, the instructions are further executable by the at least one processor to identify that the electronic device is grounded.

3. The electronic device of claim 1, further comprising:
at least one sensor,
wherein when the electronic device is identified through the at least one sensor to be grabbed by a user or contacted by a conductive object, the instructions are further executable by the at least one processor identifies that the electronic device is grounded.

4. The electronic device of claim 1, wherein the instructions are further executable by the at least one processor to identify that the first capacitance increase to the second capacitance by increasing to a second touch area of the second touch input from a first touch area of the first touch input, sets a predetermined area based on a center of the second touch area, and adjust the second capacitance by adding a preset weight to a third capacitance corresponding to the predetermined area.

5. The electronic device of claim 1, wherein the instructions are further executable by the at least one processor to compare the adjusted second capacitance with the threshold for the second touch input.

6. The electronic device of claim 5, wherein the instructions are further executable by the at least one processor to set the threshold using at least one of an angle between the touch screen and the external object, which is calculated based on the first capacitance for the first touch input, or the second capacitance.

7. An electronic device, comprising:
a touch screen;
a memory configured to store instructions; and
at least one processor coupled to the touch screen and the memory, wherein upon execution of the stored instructions, the at least one processor is configured to:
perform a first function according to a first touch input by an external object and received through the touch screen,
identify a second capacitance changed from a first capacitance of the first touch input during a preset time,
obtain a variation between the first capacitance and the second capacitance during the preset time;
set a first threshold used to identify whether to perform a second function different from the first function based on the obtained variation, and whether to perform the second function by comparing the second capacitance with the first threshold,
based on the second capacitance being equal to or more than the first threshold for a second touch input, perform a second function according to the second touch input corresponding to the second capacitance, wherein the instructions are further executable by the at least one processor to identify whether the electronic device is grounded when the variation increases to a second threshold or more, and adjust the second capacitance to a third capacitance when the electronic device is identified not to be grounded, and wherein the instructions are further executable by the at least one processor to identify a loss in the second capacitance, and adjust the second capacitance to the third capacitance by restoring the identified loss.

8. The electronic device of claim 7, wherein the instructions are further executable by the at least one processor to set the first threshold based on an angle between the touch screen and the external object, which is calculated based on the first capacitance, and the variation.

9. The electronic device of claim 7, where the instructions are further executable by the at least one processor to identify whether to perform the second function by comparing the third capacitance with the first threshold.

10. The electronic device of claim 7, where the instructions are further executable by the at least one processor to identify that the first capacitance increase to the second capacitance by increasing to a second touch area of a second touch input from a first touch area of the first touch input, set a predetermined area based on a center of the second touch area, and adjust the second capacitance by adding a preset weight to the third capacitance corresponding to the set predetermined area.

11. A non-transitory computer-readable recording medium retaining a program executed on a computer, wherein the program comprises commands executed by at least one processor to enable the at least one processor to perform a first function according to a first touch input by a received external object, identify whether an electronic device is grounded when a first capacitance of the first touch input increases to a second capacitance or more during a preset time, identify a loss in the second capacitance, adjust the second capacitance by restoring the identified loss when the electronic device is identified not to be grounded, and based on the adjusted second capacitance being equal to or more than a threshold for a second touch input, perform a second function according to the second touch input corresponding to the adjusted second capacitance.

12. The non-transitory computer-readable recording medium of claim 11, wherein the commands determining whether the electronic device is grounded includes, when the electronic device is connected with another electronic device or a charger, a command determining that the electronic device is grounded.

13. The non-transitory computer-readable recording medium of claim 11, wherein the commands determining whether the electronic device is grounded includes, when the electronic device is identified to be grabbed by a user or contacted by a conductive object through at least one sensor, a command determining that the electronic device is grounded.

14. The non-transitory computer-readable recording medium of claim 11, wherein the commands adjusting the first capacitance includes a command identifying that the first capacitance increase to the second capacitance by increasing to a second touch area of the second touch input from a first touch area of the first touch input, setting a predetermined area based on a center of the second touch area, and adjusting the second capacitance by adding a preset weight to a third capacitance corresponding to the predetermined area.

15. The non-transitory computer-readable recording medium of claim 11, wherein the commands determining whether to perform the second function includes comparing the adjusted second capacitance with a threshold.

16. The non-transitory computer-readable recording medium of claim 11, wherein the commands further enable the processor to set the second threshold using at least one of an angle between the touch screen and the external object, which is calculated based on the first capacitance for the first touch input, or the second capacitance.

* * * * *